US012437476B2

(12) United States Patent
Matsunobu et al.

(10) Patent No.: US 12,437,476 B2
(45) Date of Patent: Oct. 7, 2025

(54) THREE-DIMENSIONAL POINT CLOUD DENSIFICATION DEVICE, THREE-DIMENSIONAL POINT CLOUD DENSIFICATION METHOD, AND RECORDING MEDIUM

(71) Applicant: Panasonic Intellectual Property Management Co., Ltd., Osaka (JP)

(72) Inventors: Toru Matsunobu, Osaka (JP); Kensho Teranishi, Osaka (JP); Masaki Fukuda, Osaka (JP); Ukyou Katsura, Osaka (JP); Makoto Kohrin, Ishikawa (JP); Satoshi Yoshikawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 203 days.

(21) Appl. No.: 18/195,606

(22) Filed: May 10, 2023

(65) Prior Publication Data
US 2023/0281927 A1    Sep. 7, 2023

Related U.S. Application Data

(63) Continuation of application No. PCT/JP2021/040435, filed on Nov. 2, 2021.

(30) Foreign Application Priority Data

Nov. 16, 2020  (JP) ................................ 2020-190367

(51) Int. Cl.
G06T 17/20        (2006.01)
G06T 7/70         (2017.01)

(52) U.S. Cl.
CPC ................ G06T 17/20 (2013.01); G06T 7/70 (2017.01)

(58) Field of Classification Search
CPC ....... G06T 17/20; G06T 7/70; G06T 2210/36; G06T 2210/56; G06T 2219/2021; G06T 19/20; G06V 20/56; G06V 20/647
See application file for complete search history.

(56) References Cited

U.S. PATENT DOCUMENTS

| 2002/0190982 A1* | 12/2002 | Kotcheff | ................. | G06T 17/20 |
| | | | | 345/420 |
| 2003/0103049 A1* | 6/2003 | Kindratenko | ........... | G06T 17/20 |
| | | | | 345/428 |

(Continued)

FOREIGN PATENT DOCUMENTS

JP          2015-56142         3/2015

OTHER PUBLICATIONS

Extended European Search Report issued May 10, 2024 in corresponding European Patent Application No. 21891723.5.

(Continued)

Primary Examiner — Maurice L. McDowell, Jr.
(74) Attorney, Agent, or Firm — Wenderoth, Lind & Ponack, L.L.P.

(57) ABSTRACT

A three-dimensional point cloud densification device includes: an obtainer that obtains a plurality of three-dimensional points, each of which indicates a three-dimensional position of at least one object, and auxiliary information for creating a polygon; and a densifier that: identifies the polygon having, as vertices, at least three three-dimensional points among the plurality of three-dimensional points, based on the auxiliary information; and generates a new three-dimensional point inside the polygon.

9 Claims, 14 Drawing Sheets

(56) References Cited

U.S. PATENT DOCUMENTS

| | | | | |
|---|---|---|---|---|
| 2007/0160284 | A1* | 7/2007 | Kaufmann | G06T 17/20 |
| | | | | 382/154 |
| 2015/0077525 | A1 | 3/2015 | Fujiwara | |
| 2018/0190016 | A1* | 7/2018 | Yang | G06V 20/58 |
| 2021/0263152 | A1* | 8/2021 | Halder | G05D 1/0231 |
| 2023/0030807 | A1* | 2/2023 | Pollard | G06F 30/10 |

OTHER PUBLICATIONS

Tim Bodenmüller, "Streaming Surface Reconstruction from Real Time 3D Measurements", Jan. 2009, pp. 1-124.

Sander Oude Elberink, "Acquisition of 3D Topography", Mar. 2010, pp. 1-173.

International Search Report (ISR) issued on Jan. 18, 2022 in International (PCT) Application No. PCT/JP2021/040435.

Atsushi Takabe, et al., "Moving object detection for a 3D point cloud and images measured by an on-vehicle system", Proceedings of ITE Winter Annual Convention 2015, 22B-2 (with partial English translation).

Kana Matsuo et al., "Interactive defect complement system for 3D scan data of the room", Correspondences on Human Interface, Oct. 5, 2020, vol. 22, No. 6, pp. 51-54 (with partial English translation).

Result of Consultation issued Mar. 5, 2025 in corresponding European Patent Application No. 21891723.5.

Qing Luo, et al., "Distributed Refinement of Large-Scale 3D Mesh for Accurate Multi-View Reconstruction", IEEE Computer Society, 2018 International Conference on Virtual Reality and Visualization (ICVRV), Jul. 2018, pp. 58-61.

B. Cutler, et al., "Simplification and Improvement of Tetrahedral Models for Simulation", Eurographics Symposium on Geometry Processing, The Eurographics Association, Jul. 2004, pp. 93-102.

"Catmull-Clark subdivision surface", Retrieved from the Internet: <URL:https://en.wikipedia.org/wiki/Catmull%E2%80%93Clark_subdivision_surface>, known to Applicant on Mar. 5, 2025, pp. 1-5.

* cited by examiner

THREE-DIMENSIONAL POINT CLOUD DENSIFICATION DEVICE, THREE-DIMENSIONAL POINT CLOUD DENSIFICATION METHOD, AND RECORDING MEDIUM

CROSS REFERENCE TO RELATED APPLICATIONS

This is a continuation application of PCT International Application No. PCT/JP2021/040435 filed on Nov. 2, 2021, designating the United States of America, which is based on and claims priority of Japanese Patent Application No. 2020-190367 filed on Nov. 16, 2020. The entire disclosures of the above-identified applications, including the specifications, drawings and claims are incorporated herein by reference in their entirety.

FIELD

The present disclosure relates to a three-dimensional point cloud densification device, a three-dimensional point cloud densification method, and a recording medium.

BACKGROUND

In recent years, there are techniques for generating a three-dimensional model of a subject (an object), such as a person or a building, formed by a plurality of three-dimensional points (a three-dimensional point cloud) by measuring the three-dimensional shape of the object in a multi-viewpoint image obtained by shooting the object from multiple points of view (see, for example, Patent Literature (PTL) 1).

According to the technique disclosed in PTL 1, a three-dimensional model of an object is generated by geometrically estimating a camera parameter (such as camera position, camera direction, focal length in units of pixels, and lens distortion) used when shooting each image forming a multi-viewpoint image and then projecting each pixel of the image to a three-dimensional space using the estimated camera parameter.

CITATION LIST

Patent Literature

PTL 1: Japanese Unexamined Patent Application Publication No. 2015-056142

A three-dimensional point cloud densification device according to an aspect of the present disclosure includes: a processor; and memory, wherein using the memory, the processor: obtains a plurality of three-dimensional points and auxiliary information, the plurality of three-dimensional points each indicating a three-dimensional position of at least one object, the auxiliary information being provided for creating a polygon; identifies the polygon having, as vertices, at least three three-dimensional points among the plurality of three-dimensional points, based on the auxiliary information; and generates a new three-dimensional point inside the polygon, and the auxiliary information is provided for selecting at least one of: at least one three-dimensional point among the plurality of three dimensional points; or a mesh line connecting any two three-dimensional points among the plurality of three-dimensional points.

Furthermore, a three-dimensional point cloud densification method according to an aspect of the present disclosure includes: obtaining a plurality of three-dimensional points and auxiliary information, the plurality of three-dimensional points each indicating a three-dimensional position of at least one object, the auxiliary information being provided for creating a polygon; identifying the polygon having, as vertices, at least three three-dimensional points among the plurality of three-dimensional points, based on the auxiliary information; and generating a new three-dimensional point inside the polygon, wherein the auxiliary information is provided for selecting at least one of: at least one three-dimensional point among the plurality of three dimensional points; or a mesh line connecting any two three-dimensional points among the plurality of three-dimensional points.

It should be noted that the present disclosure may be implemented as a program for causing a computer to execute the steps included in the three-dimensional point cloud densification method described above. Furthermore, the present disclosure may be implemented as a non-transitory computer readable recording medium, such as a CD-ROM and the like, on which the program is recorded. Furthermore, the present disclosure may be implemented as information, data, or a signal of the program. In addition, the program, the information, the data, and the signal may be distributed via a communication network such as the Internet, and the like.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
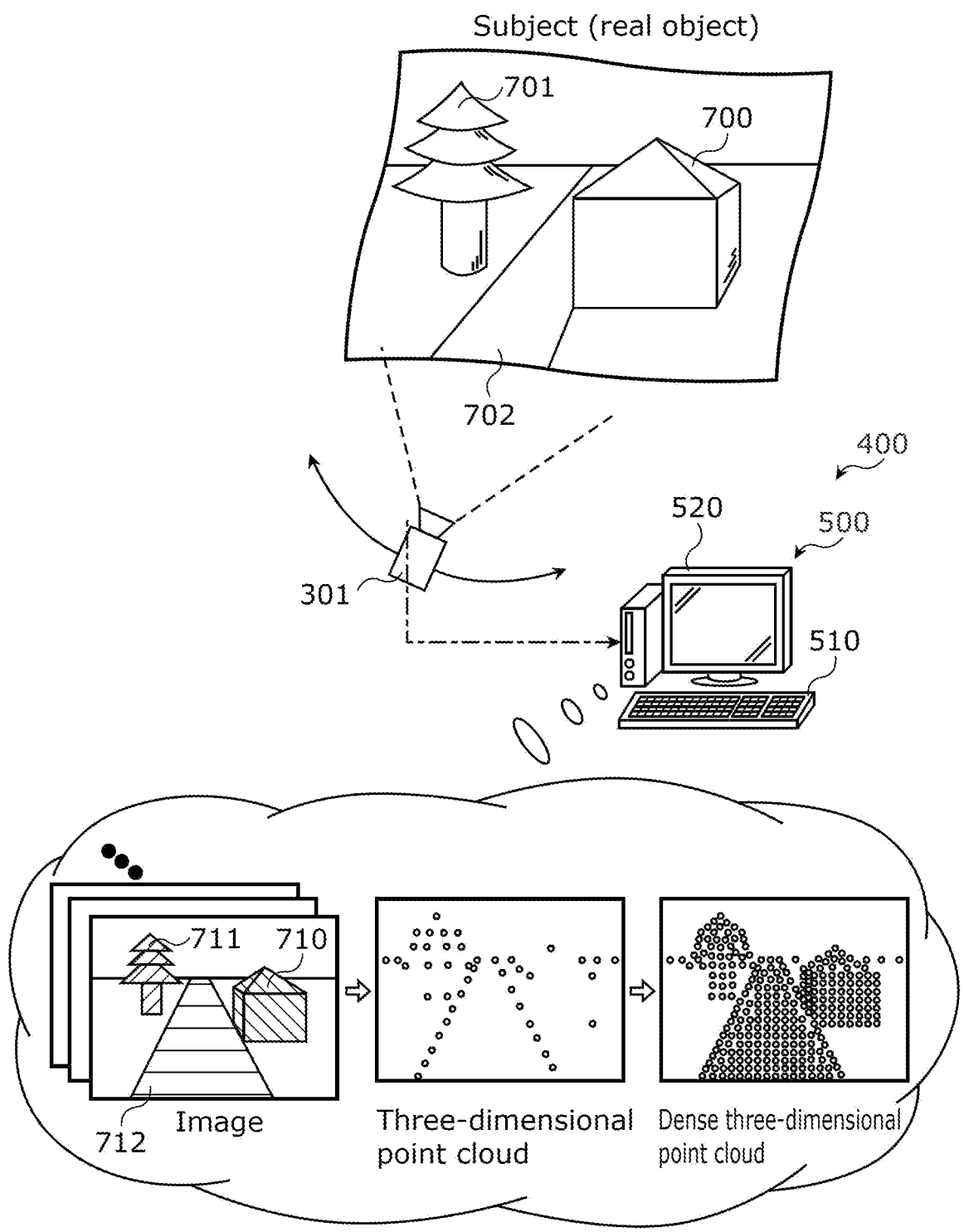
FIG. 1 is a diagram for describing a three-dimensional point cloud generation system according to an embodiment.

DESCRIPTION OF EMBODIMENTS (Outline of Present Disclosure)

A three-dimensional point cloud densification device according to an aspect of the present disclosure includes: an obtainer that obtains a plurality of three-dimensional points and auxiliary information, the plurality of three-dimensional points each indicating a three-dimensional position of at least one object, the auxiliary information being provided for creating a polygon; and a densifier that: identifies the polygon having, as vertices, at least three three-dimensional points among the plurality of three-dimensional points, based on the auxiliary information; and generates a new three-dimensional point inside the polygon.

Accordingly, the densifier can identify a polygon having at least three three-dimensional points as vertices based on the auxiliary information. Therefore, the densifier can generate a new three-dimensional point at an appropriate position by adding (generating) a three-dimensional point in the identified polygon.

Furthermore, for example, the obtainer obtains the auxiliary information via an operation device for receiving an instruction from a user, and the instruction specifies a shape of the polygon.

Accordingly, since the densifier identifies a polygon by obtaining a specification of the shape of the polygon from the user, the densifier can generate a new three-dimensional point at a position desired by the user.

Furthermore, for example, the three-dimensional point cloud densification device according to the present disclosure further includes a generator that generates the auxiliary information based on image data obtained by shooting the at least one object.

Furthermore, for example, the generator generates, as the auxiliary information, type information indicating types of objects included in the image data, and assigns, to each of the plurality of three-dimensional points, the type information corresponding to the three-dimensional point. For example, the densifier identifies the polygon having, as vertices, the at least three three-dimensional points that have a same type of object.

Accordingly, the densifier can generate a new three-dimensional point that complements three-dimensional points forming an object of the same type.

Furthermore, for example, the generator generates, as the auxiliary information, an edge of an object included in the image data, and the densifier identifies the polygon that does not cross the edge.

Accordingly, the densifier can prevent a new three-dimensional point from being generated at a position between different objects where no object exists.

Furthermore, for example, the obtainer obtains, as the auxiliary information, camera information indicating a position and an orientation of a camera at a time of shooting, the camera generating image data items obtained by shooting the at least one object. For example, the densifier identifies the polygon based on the camera information.

Furthermore, for example, the densifier identifies the polygon having, as vertices, the at least three three-dimensional points that are located below a predetermined position among the plurality of three-dimensional points, based on a vertical direction in a virtual three-dimensional space representing the plurality of three-dimensional points, the vertical direction being determined based on the camera information.

Accordingly, the densifier can determine the types of objects by regarding a plurality of three-dimensional points located at lower positions among the three-dimensional points included in the three-dimensional point cloud as the ground, such as a road, for example, and identify a polygon having three-dimensional points of the same object type as vertices.

Furthermore, for example, the densifier determines a height of the camera in the vertical direction based on the camera information, and determines the predetermined position to be below the height determined.

Accordingly, the densifier can more appropriately identify a three-dimensional point whose object type is ground based on the height of the camera.

Furthermore, for example, the densifier identifies the polygon based on an angle formed by the vertical direction and a normal direction of the polygon having, as vertices, the at least three three-dimensional points that are located below the predetermined position among the plurality of three-dimensional points.

For example, the normal direction of a polygon having, as vertices, three-dimensional points forming the ground, a road or the like is likely to be the same as the vertical direction. That is, when the vertical direction and the normal direction of a polygon having, as vertices, at least three three-dimensional points forming the ground, a road or the like are not parallel, and the angle therebetween is too great, at least one of the at least three three-dimensional points is likely to be noise, rather than a three-dimensional point forming the ground, a road or the like. Therefore, with such a configuration, the densifier can prevent a new three-dimensional point from being generated in a polygon having, as a vertex, a three-dimensional point that is not likely to be a three-dimensional point forming the ground, a road or the like, for example.

Furthermore, for example, the auxiliary information is information indicating groups to which the plurality of three-dimensional points belong, and the densifier identifies the polygon having, as vertices, the at least three three-dimensional points among three-dimensional points that belong to a same group based on the auxiliary information.

Accordingly, the densifier can identify a polygon having, as vertices, three-dimensional points that form or are likely to form the same object, since the densifier identifies a polygon based on the auxiliary information that indicates, as three-dimensional points belonging to the same group, three-dimensional points that form or are likely to form the same object, such as three-dimensional points of the same object type, three-dimensional points that can be connected by lines that do not straddle an edge of an object included in the image data, or three-dimensional points located below a predetermined position in the virtual three-dimensional space (virtual space) representing three-dimensional points.

Furthermore, a three-dimensional point cloud densification method according to an aspect of the present disclosure includes: obtaining a plurality of three-dimensional points and auxiliary information, the plurality of three-dimensional points each indicating a three-dimensional position of at least one object, the auxiliary information being provided for creating a polygon; identifying the polygon having, as vertices, at least three three-dimensional points among the plurality of three-dimensional points, based on the auxiliary information; and generating a new three-dimensional point inside the polygon.

Accordingly, the same advantageous effects as the three-dimensional point cloud densification device can be produced.

It should be noted that the present disclosure may be implemented as a program for causing a computer to execute the steps included in the three-dimensional point cloud densification method described above.

Hereinafter, embodiments of a three-dimensional point cloud densification device, and so on, according to the present disclosure will be described in detail with reference to the drawings. It should be noted that each of the subsequently described embodiments shows a specific example of the present disclosure. Accordingly, numerical values, shapes, materials, structural components, the arrangement and connection of the structural components, steps, and the processing order of the steps, etc., shown in each of the following embodiments are merely examples, and are therefore not intended to limit the scope of the present disclosure.

Furthermore, among the structural components described in the following embodiments, structural components not recited in the independent claims which indicate implementations according to a form of the present disclosure are described as optional structural components. Implementations of the present disclosure are not limited to those recited in the current independent claims, and may be expressed by other independent claims.

Furthermore, the respective figures are not necessarily precise illustrations. In the figures, structural components that are substantially the same are assigned the same reference signs, and overlapping description thereof may be omitted or simplified.

Embodiment

[Three-Dimensional Point Cloud Generation System]

First, a configuration of three-dimensional point cloud generation system 400 including three-dimensional point cloud densification device 100 according to an embodiment will be described.

Figure 2:
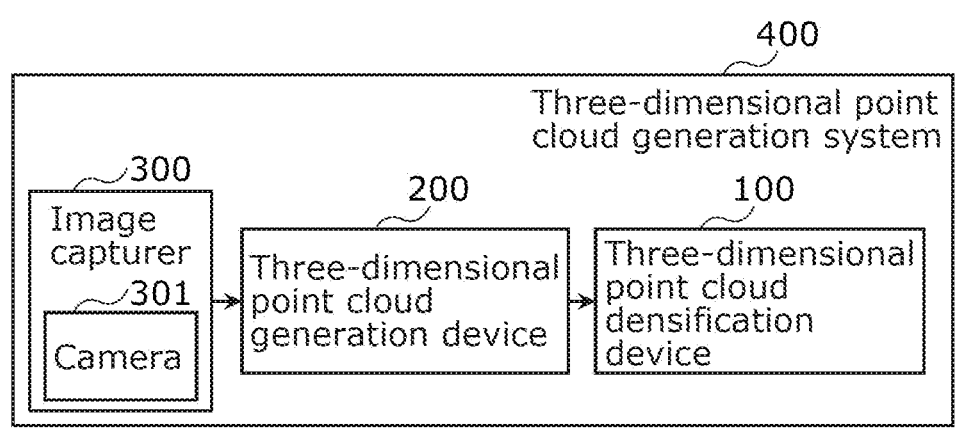
FIG. 2 is a block diagram illustrating a configuration of the three-dimensional point cloud generation system according to the embodiment.

FIG. 1 is a diagram for describing three-dimensional point cloud generation system 400 according to the embodiment. FIG. 2 is a block diagram illustrating a configuration of three-dimensional point cloud generation system 400 according to the embodiment.

Three-dimensional point cloud generation system 400 includes image capturer 300, which is a shooting device (camera) that shoots a predetermined region, three-dimensional point cloud generation device 200 that generates a three-dimensional point cloud (more specifically, point cloud data representing the three-dimensional point cloud) formed by a plurality of three-dimensional points forming a three-dimensional model of an object included in a plurality of images (more specifically, image data) generated by image capturer 300 based on the plurality of images, and three-dimensional point cloud densification device 100 that generates a dense three-dimensional point cloud (more specifically, data representing the dense three-dimensional point cloud) by generating a new three-dimensional point and adding the new three-dimensional point to the generated three-dimensional point cloud.

Note that object means at least one body in a space (a predetermined region), for example. Alternatively, for example, object may mean at least one subject when the object is produced in shooting. Alternatively, for example, object means at least one measurement target when the object is produced in distance measurement.

When a real object (such as object 700, 701, or 702 illustrated in FIG. 1) is shot to produce a plurality of images, and an object (such as object 710, 711, or 712 illustrated in FIG. 1) included in the plurality of images is reproduced, or represented (generated), in a virtual three-dimensional space from the plurality of images, the reproduced object is referred to as a three-dimensional model. The three-dimensional model is a set of a plurality of three-dimensional points (a three-dimensional point cloud).

Predetermined region means a region that includes, as an object, a stationary body that is standing still or a moving body that is moving, such as a person, or both of such bodies. In other words, predetermined region means a region that includes, as a subject, at least one of a stationary body that is standing still or a moving body that is moving. Examples of the predetermined region including both the stationary body and the moving body include a game of a sport, such as basketball, and a street on which there are people and automobiles. The predetermined region need not be a particular entity that will constitute a subject but may be a scene, such as a landscape. In the following, a predetermined region including not only a particular entity but also a landscape or the like will be referred to simply as an object.

Point cloud data is information including data of each of a plurality of three-dimensional points. A three-dimensional point is information that indicates a three-dimensional position (three-dimensional coordinates) of at least one object, for example. The three-dimensional point includes ternary information (that is, position information indicating coordinates) including an X component, a Y component, and a Z component in a three-dimensional space defined by an X axis, a Y axis, and Z axis that are perpendicular to each other, for example. In addition to the position information, the three-dimensional point may include color information indicating a color of the three-dimensional point or so-called attribute information, such as texture information indicating a surface configuration of the three-dimensional point or a periphery thereof.

Three-dimensional point cloud generation system 400 includes image capturer 300, three-dimensional point cloud generation device 200, and three-dimensional point cloud densification device 100.

Image capturer 300 is a shooting device for shooting an object. Image capturer 300 is formed by one or more cameras 301, for example, and outputs a plurality of images generated by shooting an object to three-dimensional point cloud generation device 200.

Image capturer 300 may include a plurality of cameras 301 or may include one camera 301. For example, a user may use one camera 301 by moving camera 301 while camera 301 generates a plurality of images (in other words, multi-viewpoint video data) from different points of view. That is, a plurality of images output by image capturer 300 to three-dimensional point cloud generation device 200 may be any images shot (generated) by cameras 301 of image capturer 300 that are different in at least one of position or orientation.

Camera 301 may be a camera that generates a two-dimensional image or a camera that includes a three-dimensional measurement sensor that generates a three-dimensional model. In this embodiment, image capturer 300 has camera 301 that generates a two-dimensional image.

Image capturer 300 is configured to be able to be connected to three-dimensional point cloud generation device 200 or a hub (not shown), such as communication equipment or a server, by wire or radio so that image capturer 300 can output a generated image to three-dimensional point cloud generation device 200.

Images generated by image capturer 300 may be output in real time or may be temporarily recorded in an external storage device, such as a memory or a cloud server, and then output from the external storage device.

When image capturer 300 has a plurality of cameras 301, cameras 301 may be cameras 301 fixed so that cameras 301 are different from each other in at least one of position or orientation. Orientation of camera 301 means at least one of shooting direction of camera 301 or inclination of camera 301.

The type of camera 301 is not particularly limited. Camera 301 may be a video camera, a smartphone, or a mobile camera, such as a wearable camera, for example. Camera 301 may be a moving camera, such as a drone with a shooting capability, or a fixed camera, such as a security camera.

Three-dimensional point cloud generation device 200 is a device that generates a three-dimensional point cloud based on a plurality of images output from image capturer 300.

Three-dimensional point cloud generation device 200 estimates (calculates), based on a plurality of images, camera information (also referred to as a camera parameter) that indicates the positions, orientations or the like of a camera when image capturer 300 generates the images, for example.

Here, camera information is a parameter that indicates a property of camera 301, such as an internal parameter including focal length and image center of camera 301, an external parameter indicating the position (more specifically, the three-dimensional position) and orientation of camera 301 during shooting, or a parameter including the distance between camera 301 and an object. When a plurality of shootings is performed by camera 301 while moving camera 301, the camera information may include information indicating the trajectory of camera 301 during shooting of the plurality of images.

The estimation method in which three-dimensional point cloud generation device 200 estimates the position and orientation of camera 301 is not particularly limited. For example, three-dimensional point cloud generation device 200 uses the Visual-SLAM (Simultaneous Localization and Mapping) technology or Structure-from-Motion (SfM) technology to estimate the position and orientation of camera 301 during generation of images. Image capturer 300 may include LiDAR, and three-dimensional point cloud generation device 200 may estimate the camera information based on information obtained from the LiDAR.

The camera information may be output from image capturer 300 to three-dimensional point cloud generation device 200 or may be stored in advance in a memory (not shown) of three-dimensional point cloud generation device 200. In the latter case, three-dimensional point cloud generation device 200 need not estimate the camera information.

Three-dimensional point cloud generation device 200 generates a three-dimensional model (a three-dimensional point cloud) in a three-dimensional space (a virtual space) based on the camera information and a plurality of images.

For example, three-dimensional point cloud generation device 200 is implemented by a computer system that includes a control program, a processing circuit that executes the control program, such as a processor or a logic circuit, and a recording device that stores the control program, such as an internal memory or an external memory that can be accessed. In this embodiment, three-dimensional point cloud generation device 200 and three-dimensional point cloud densification device 100 are implemented as computer 500.

Computer 500 is a device (system) that includes a processor, a memory that stores a program to be executed by the processor, a communication interface for communication with image capturer 300 or the like, operation device 510 that receives an input from a user, and display device 520 that displays an image, a three-dimensional point cloud or the like.

The communication interface may be a radio communication interface including an antenna and a radio communication circuit, or may be a wired communication interface including a connector to be connected to a communication line.

Operation device 510 is a user interface to be operated by a user and is a device implemented by a keyboard, a mouse, or a touch panel, for example.

Display device 520 is a display for displaying an image, a three-dimensional point cloud or the like.

Three-dimensional point cloud generation device 200 outputs a three-dimensional point cloud and camera information generated to three-dimensional point cloud densification device 100.

Three-dimensional point cloud generation device 200 may further output a plurality of images used for generating the three-dimensional point cloud to three-dimensional point cloud densification device 100.

Note that image capturer 300 and three-dimensional point cloud generation device 200 may be integrally formed by one computer having a shooting capability.

When three-dimensional point cloud generation device 200 and three-dimensional point cloud densification device 100 are implemented by different computers or the like, three-dimensional point cloud generation device 200 and three-dimensional point cloud densification device 100 may be communicatively connected via a network, or may be configured to be able to exchange data offline via an HDD (hard disk drive) or the like.

Three-dimensional point cloud densification device 100 may calculate camera information or store camera information in advance. In that case, three-dimensional point cloud generation device 200 need not output camera information to three-dimensional point cloud densification device 100.

Three-dimensional point cloud densification device 100 is a device that generates a dense three-dimensional point cloud by generating a new three-dimensional point for a three-dimensional point cloud generated by three-dimensional point cloud generation device 200.

For example, three-dimensional point cloud densification device 100 is implemented by a computer system that includes a control program, a processing circuit that executes the control program, such as a processor or a logic circuit, and a recording device that stores the control program, such as an internal memory or an external memory that can be accessed. In this embodiment, three-dimensional point cloud densification device 100 and three-dimensional point cloud generation device 200 are implemented as computer 500.

Three-dimensional point cloud densification device 100 and three-dimensional point cloud generation device 200 may be implemented by one processor or may be implemented by different processors. The programs to be executed by three-dimensional point cloud densification device 100 and three-dimensional point cloud generation device 200 may be stored in one memory or may be stored in different memories.

Figure 3:
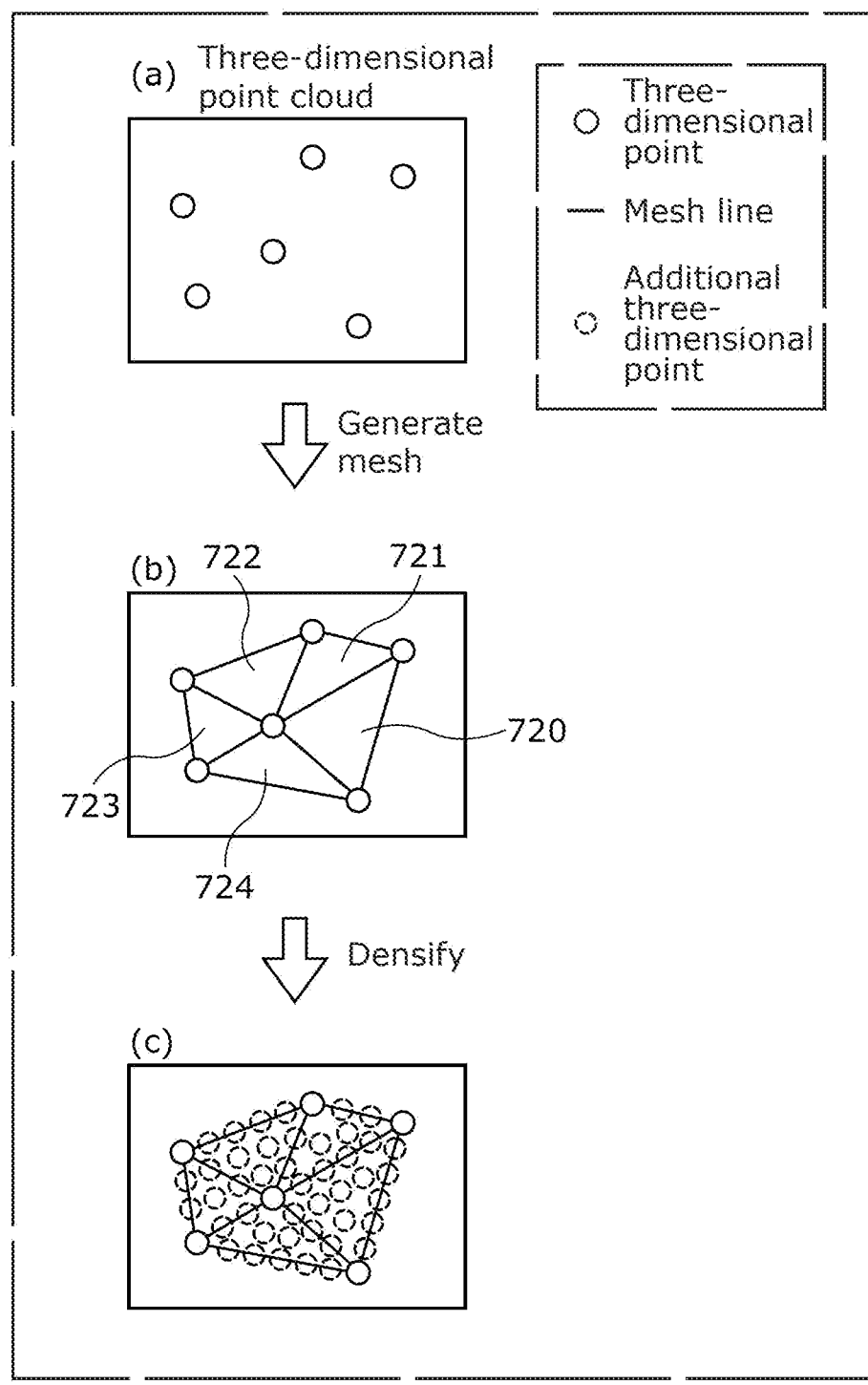
FIG. 3 is a diagram for describing a dense three-dimensional point cloud generated by the three-dimensional point cloud generation system according to the embodiment.

FIG. 3 is a diagram for describing a dense three-dimensional point cloud generated by three-dimensional point cloud generation system 400 according to the embodiment.

First, as illustrated in Part (a) of FIG. 3, three-dimensional point cloud generation device 200 generates a three-dimensional point cloud based on a plurality of images generated by image capturer 300.

As illustrated in Part (b) of FIG. 3, three-dimensional point cloud densification device 100 then generates a mesh by connecting a plurality of three-dimensional points included in the three-dimensional point cloud by a straight line (also referred to as a mesh line).

Generating a mesh means connecting a plurality of three-dimensional points by mesh lines to create a polygon having the three-dimensional points as vertices. The mesh is formed by a plurality of polygons.

In the example illustrated in Part (b) of FIG. 3, five polygons 720, 721, 722, 723, and 724 each having three three-dimensional points as vertices are created. Three-dimensional point cloud densification device 100 connects neighboring three-dimensional points by mesh lines in such a manner that the mesh lines do not come into contact (intersect) with each other. Of course, three-dimensional point cloud densification device 100 need not generate a mesh line to connect three-dimensional points as far as a region (polygon) having three-dimensional points as vertices is identified.

As illustrated in Part (c) of FIG. 3, three-dimensional point cloud densification device 100 then generates a new three-dimensional point (an additional three-dimensional point) in a region defined by mesh lines, that is, in a polygon, to generate a dense three-dimensional point cloud.

"In a polygon" means not only inside the region defined by mesh lines but also on the mesh lines.

If three-dimensional points at inappropriate positions are connected, that is, if polygons having at least three three-dimensional points as vertices are not appropriately created, a three-dimensional model having a different shape than the real object may be generated because of an additional three-dimensional point cloud generated at a position where no object exists.

To avoid this, three-dimensional point cloud densification device 100 generates a new three-dimensional point in a polygon having at least three of the plurality of three-dimensional points as vertices based on auxiliary information for creating polygons. [Configuration of three-dimensional point cloud densification device]Next, a configuration of three-dimensional point cloud densification device 100 will be described in detail.

Figure 4:
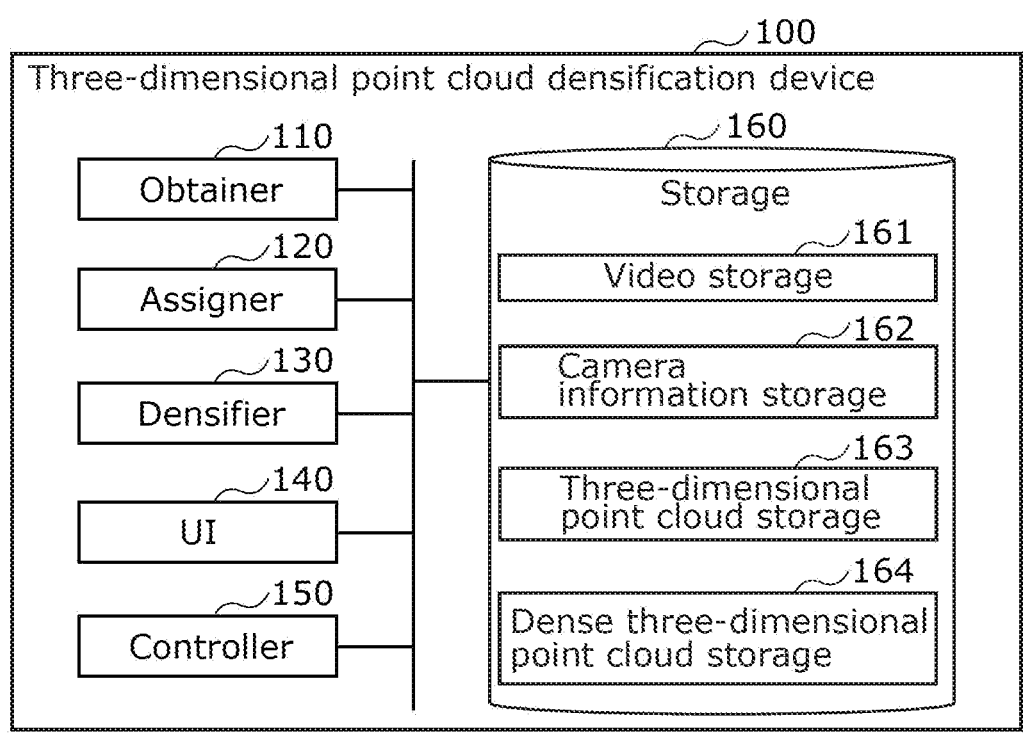
FIG. 4 is a block diagram illustrating a configuration of a three-dimensional point cloud densification device according to the embodiment.

FIG. 4 is a block diagram illustrating a configuration of three-dimensional point cloud densification device 100 according to the embodiment.

Three-dimensional point cloud densification device 10 includes obtainer 110, assigner (generator) 120, densifier 130, UI (user interface) 140, controller 150, and storage 160.

Obtainer 110 is a processing unit that obtains data output from three-dimensional point cloud generation device 200 and data stored in storage 160, for example. For example, obtainer 110 obtains data from three-dimensional point cloud generation device 200, storage 160, and a server or the like (not shown) via a communication interface, a communication line or the like (not shown) for wired or radio communication of three-dimensional point cloud densification device 100.

Obtainer 110 obtains a plurality of three-dimensional points each indicating the three-dimensional position of at least one object and auxiliary information for creating (identifying) a polygon.

Information for creating a polygon having at least three three-dimensional points as vertices includes primary information and auxiliary information other than the primary information. The primary information is well-known information used for creating a polygon. The primary information relates to the distance between two three-dimensional points, for example. When the distance between two three-dimensional points is less than a predetermined threshold, the two three-dimensional points are regarded as vertices, and a mesh line is defined by connecting the two three-dimensional points. The auxiliary information is used to choose at least one of three-dimensional points or a mesh line connecting two three-dimensional points, in order to create an appropriate polygon.

A mesh line connects three-dimensional points that belong to the same group and does not connect three-dimensional points that belong to different groups, for example. The auxiliary information is information that indicates groups to which each of a plurality of three-dimensional points belongs, for example.

The auxiliary information is also information that indicates a type of an object formed by three-dimensional points, information that indicates a group arbitrarily set by a user, and information that indicates an object included in an image used when generating a three-dimensional point cloud, for example.

Edge used herein may mean not only a line that defines the circumference of an object included in an image but also a ridge (a boundary between two different faces) in an object in an image. Edge may also mean a line (a link between three-dimensional points) that defines a three-dimensional model in a three-dimensional space (that is, a virtual three-dimensional space in which a plurality of three-dimensional points is represented) on a computer. Furthermore, edge may mean a line defining a three-dimensional model projected onto a two-dimensional plane (such as an image).

The camera information described above may be used as the auxiliary information.

Alternatively, the auxiliary information may be list information that indicates three-dimensional points that can be connected by a mesh line.

For example, obtainer 110 obtains the auxiliary information via operation device 510 for receiving an instruction from a user. The instruction is an instruction that specifies the shape of a polygon, for example. Specifically, the instruction that specifies the shape of a polygon is an instruction that specifies three-dimensional points to be connected by a mesh line and/or an instruction that specifies the position of a mesh line to be drawn.

Obtainer 110 is communicatively connected to operation device 510 and obtains the auxiliary information from a user via operation device 510.

For example, obtainer 110 obtains, as the auxiliary information, camera information that indicates the position (that is, trajectory) and orientation, during shooting, of camera 301 that shoots at least one object and generates a plurality of items of image data. Obtainer 110 may obtain the camera information as the auxiliary information.

For example, obtainer 110 obtains a plurality of items of image data used when generating a three-dimensional point cloud.

Assigner 120 is a processing unit that generates auxiliary information. For example, assigner 120 is a processing unit that assigns, to each of three-dimensional points included in a three-dimensional point cloud, auxiliary information corresponding to the three-dimensional point. Assigning means adding auxiliary information to (associating auxiliary information with) data of a three-dimensional point, for example.

For example, assigner 120 generates auxiliary information based on image data obtained by shooting at least one object. The image data is an image used when three-dimensional point cloud generation device 200 generates a three-dimensional point cloud, for example. Note that the image data may be an image that is not used when three-dimensional point cloud generation device 200 generates a three-dimensional point cloud.

Specifically, assigner 120 generates, as auxiliary information, type information that indicates types of a plurality of objects included in image data obtained by obtainer 110, and assigns type information corresponding to each of a plurality of three-dimensional points to the three-dimensional point.

Alternatively, assigner 120 generates, as auxiliary information, an edge of an object included in image data obtained by obtainer 110, for example.

Densifier 130 is a processing unit that generates a dense three-dimensional point cloud (more specifically, data representing a dense three-dimensional point cloud) by generating a new three-dimensional point (more specifically, data representing a three-dimensional point) for a three-dimensional point cloud and adding the new three-dimensional point to the three-dimensional point cloud. Densifier 130 identifies (creates) a polygon having at least three of a plurality of three-dimensional points as vertices based on auxiliary information, and generates a new three-dimensional point in the identified polygon.

The new three-dimensional point may be generated by interpolation between at least two three-dimensional points or may be generated by feature point matching between at least two images (for example, images generated by shooting with camera 301), for example. However, the method of generating a new three-dimensional point is not limited to these methods, and any well-known method can be used.

For example, based on auxiliary information that specifies a shape of a polygon obtained by obtainer 110 from a user via operation device 510, densifier 130 identifies a polygon having at least three of a plurality of three-dimensional points as vertices.

Identifying a polygon means identifying the position of a polygonal region having at least three three-dimensional points as vertices for determining the position of a new three-dimensional point to be generated. Concerning the polygon, as with the mesh line, a polygon need not be created (that is, a mesh line need not be generated) as far as a polygon is identified.

For example, densifier 130 identifies, based on auxiliary information, a polygon having, as vertices, at least three of three-dimensional points that belong to the same group and generates a new three-dimensional point in the identified polygon.

Note that densifier 130 may identify a polygon by connecting three-dimensional points by mesh lines based on auxiliary information, and generate a new three-dimensional point in the identified polygon. Alternatively, densifier 130 may identify polygons by temporarily connecting three-dimensional points by mesh lines, then delete part of the mesh lines connecting the three-dimensional points (that is, make some three-dimensional points look like not being connected by mesh lines) based on auxiliary information, and generate a new three-dimensional point in a polygon formed by remaining mesh lines. In other words, densifier 130 may identify a polygon by determining three-dimensional points that constitute vertices of the polygon based on auxiliary information, or may temporarily identify polygons, then reduce the three-dimensional points to constitute vertices based on auxiliary information and identify again a polygon in which an additional three-dimensional point is to be generated.

For example, densifier 130 identifies a polygon having at least three three-dimensional points as vertices that are of the same type of object, and generates a new three-dimensional point in the identified polygon. Note that densifier 130 (or assigner 120) may assign type information indicating the same type as the at least three three-dimensional points to the newly generated three-dimensional point.

Alternatively, for example, densifier 130 identifies a polygon that intersects with no edge, and generates a new three-dimensional point in the identified polygon. For example, densifier 130 identifies a polygon that can be formed in such a manner that the polygon intersects with no edge, and generates a new three-dimensional point in the identified polygon.

Alternatively, for example, densifier 130 identifies a polygon having at least three of a plurality of three-dimensional points as vertices based on camera information, and generates a new three-dimensional point in the identified polygon. Specifically, densifier 130 identifies a polygon having, as vertices, at least three of a plurality of three-dimensional points located below a predetermined position in a vertical direction in a virtual three-dimensional space (that is, in a virtual space on a computer) representing the plurality of three-dimensional points, the vertical direction being determined based on the camera information, and generates a new three-dimensional point in the identified polygon.

The predetermined position may be arbitrarily determined in advance. As described above, the camera information includes information indicating the position of camera 301 during shooting. For example, densifier 130 determines the height of camera 301 in the vertical direction in the virtual three-dimensional space based on the camera information, and determines the predetermined position based on the determined height, more specifically, below the determined height. Alternatively, densifier 130 may regard the position (height) of camera 301 indicated by the camera information as a predetermined height.

Note that densifier 130 may determine three-dimensional points that constitute vertices of a polygon based on auxiliary information and camera information indicating at least one of the trajectory or orientation of camera 301 during shooting.

The camera information includes information indicating the trajectory (movement trajectory) of camera 301 during shooting, and densifier 130 may identify a polygon having at least three of a plurality of three-dimensional points as vertices based on the information indicating the trajectory of camera 301 included in the camera information. For example, the trajectory of camera 301 lies in a space where camera 301 can pass through, and therefore the possibility that there is no object on the trajectory of camera 301 is high. Therefore, densifier 130 need not generate, or may delete, a mesh line that intersects with the trajectory of the camera.

UI 140 is a user interface for receiving an input from a user or displaying an image to the user. UI 140 is implemented by operation device 510, display device 520 or the like, for example.

Controller 150 is a processing unit for controlling operation timing or the like of each processing unit, UI 140 and the like of three-dimensional point cloud densification device 100.

Storage 160 is a storage device that stores data, such as a three-dimensional point cloud, a dense three-dimensional point cloud, auxiliary information, a plurality of images, and camera information, and a control program to be executed by each processing unit of three-dimensional point cloud densification device 100, for example. Storage 160 is implemented by an HDD or a flash memory, for example.

Storage 160 includes video storage 161, camera information storage 162, three-dimensional point cloud storage 163, and dense three-dimensional point cloud storage 164, for example.

Video storage 161 stores a plurality of images (a plurality of items of image data) used for generating a three-dimensional point cloud.

Camera information storage 162 stores camera information.

Three-dimensional point cloud storage 163 stores a three-dimensional point cloud (three-dimensional point cloud data).

Dense three-dimensional point cloud storage 164 stores a dense three-dimensional point cloud (dense three-dimensional point cloud data). Note that dense three-dimensional point cloud storage 164 may store only information of a three-dimensional point added to a three-dimensional point cloud stored in three-dimensional point cloud storage 163.

Note that video storage 161, camera information storage 162, three-dimensional point cloud storage 163, and dense three-dimensional point cloud storage 164 may be implemented by one storage device or implemented by different storage devices.

[Processing Procedure of Three-Dimensional Point Cloud Densification Device]

Next, a processing procedure of generating a dense three-dimensional point cloud performed by three-dimensional point cloud densification device 100 will be described in detail.

(Outline)

Figure 5:
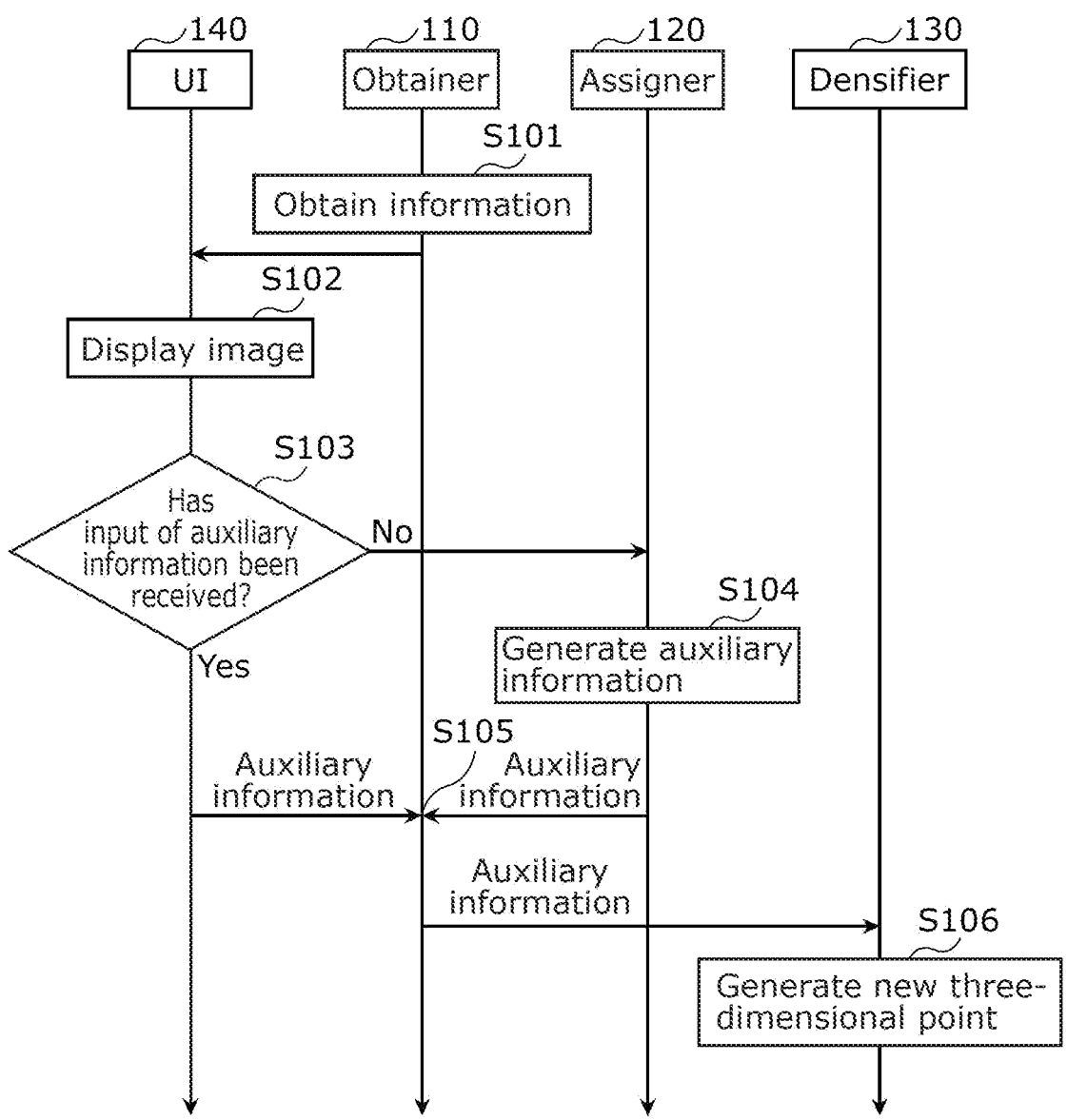
FIG. 5 is a sequence diagram illustrating a processing procedure of respective units included in the three-dimensional point cloud densification device according to the embodiment.

FIG. 5 is a sequence diagram illustrating a processing procedure of units (more specifically, UI 140, obtainer 110, assigner 120, and densifier 130) of three-dimensional point cloud densification device 100 according to the embodiment.

First, obtainer 110 obtains information for densifier 130 to generate a dense three-dimensional point cloud (S101). For example, obtainer 110 obtains a three-dimensional point cloud, auxiliary information and the like from storage 160.

Note that obtainer 110 may start step S101 when obtainer 110 obtains, from a user via UI 140, an instruction to start execution of a process (densification process) of generating a dense three-dimensional point cloud, for example.

UI 140 then displays an image for receiving an instruction from the user (S102). Here, the user is prompted to choose whether or not to manually assign auxiliary information to a three-dimensional point cloud, for example.

It is then determined whether or not UI 140 has received auxiliary information input by the user (S103). The determination can be performed by any processing unit of three-dimensional point cloud densification device 100. For example, the determination can be performed by obtainer 110 or controller 150.

When it is determined that UI 140 has not received auxiliary information input by the user (No in S103), assigner 120 generates auxiliary information for each three-dimensional point (S104).

When it is determined that UI 140 has received auxiliary information input by the user (Yes in S103), obtainer 110 obtains the auxiliary information from UI 140. When assigner 120 generates auxiliary information (S104), obtainer 110 obtains the auxiliary information from assigner 120 (S105).

Densifier 130 then generates a new three-dimensional point based on the three-dimensional point cloud and the auxiliary information obtained by obtainer 110 (S106).

(Obtaining Process)

Figure 6:
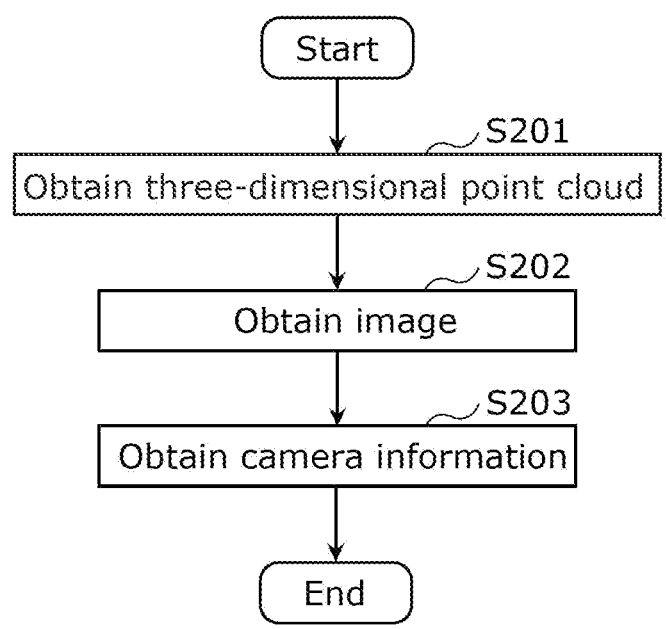
FIG. 6 is a flowchart illustrating an obtaining process of the three-dimensional point cloud densification device according to the embodiment.

FIG. 6 is a flowchart illustrating an obtaining process of three-dimensional point cloud densification device 100 according to the embodiment.

First, obtainer 110 obtains a three-dimensional point cloud from three-dimensional point cloud generation device 200, and stores the obtained three-dimensional point cloud in three-dimensional point cloud storage 163 (S201).

Obtainer 110 then obtains, from three-dimensional point cloud generation device 200, an image shot in the same space as the three-dimensional point cloud obtained in step S201, and stores the obtained image in video storage 161 (S202). The image shot in the same space means a plurality of images used for generating the three-dimensional point cloud, for example. Alternatively, when the three-dimensional point cloud is generated based on an image according to SfM or the like, the image shot in the same space may be that image, or when the three-dimensional point cloud is generated using laser scanning, the image shot in the same space may be an image shot by camera 301 in a known positional relationship with the laser device that performs the laser scanning in order to assign attribute information indicating color to each three-dimensional point of the three-dimensional point cloud, for example.

Obtainer 110 then obtains, from three-dimensional point cloud generation device 200, camera information indicating the three-dimensional position and orientation of camera 301 at the time when the image obtained in step S202 is shot, and stores the obtained camera information in camera information storage 162 (S203). When the three-dimensional point cloud is generated based on an image according to SfM or the like, for example, the camera information includes the three-dimensional position and orientation of camera 301 at the time when the image is shot. Alternatively, when the three-dimensional point cloud is generated using laser scanning, the camera information includes information indicating the three-dimensional position and orientation of camera 301 in a known positional relationship with the laser device that performs the laser scanning. The camera information may include information indicating the three-dimensional position of the laser device.

Note that obtainer 110 can obtain any image as far as the image is an image of the same space as the three-dimensional point cloud. For example, obtainer 110 may obtain an image that is not used by three-dimensional point cloud generation device 200 for generating the three-dimensional point cloud and camera information indicating the position and orientation of the camera that generates the image obtained by GPS (Global Positioning System), a gyro sensor or the like.

Obtainer 110 need not obtain an image and camera information when the image and the camera information are not used as auxiliary information for the three-dimensional point cloud.

Therefore, the processing performed by three-dimensional point cloud densification device 100 can be reduced, and the information stored in storage 160 can also be reduced.

(Display Example)

Figure 7:
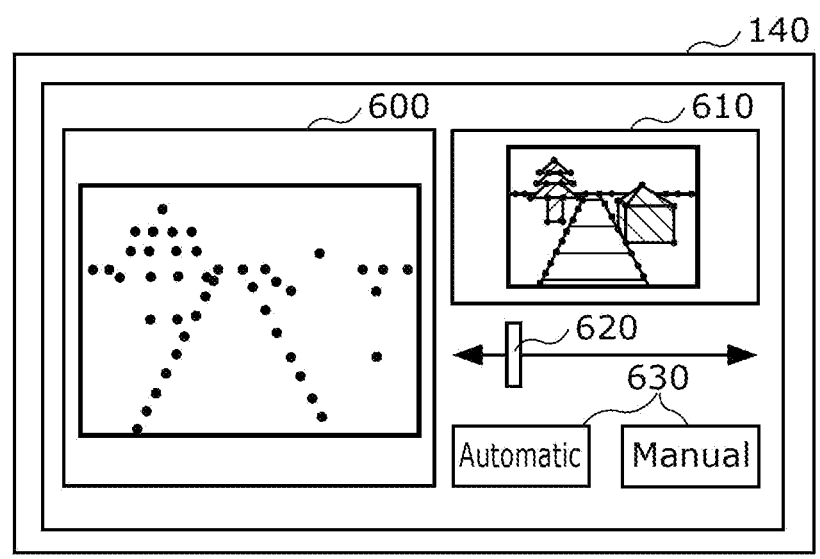
FIG. 7 is a diagram illustrating an example of images displayed by a UI of included in the three-dimensional point cloud densification device according to the embodiment.

FIG. 7 is a diagram illustrating an example of images displayed by UI 140 of three-dimensional point cloud densification device 100 according to the embodiment. Note that FIG. 7 illustrates a display device of UI 140 displaying images.

As illustrated in FIG. 7, in step S102 illustrated in FIG. 5, for example, UI 140 displays point cloud image 600, superimposed image 610, an image including adjuster 620, and an image including selector 630.

Point cloud image 600 is an image including a three-dimensional point cloud.

Superimposed image 610 is an image (two-dimensional image) used for generating a three-dimensional point cloud on which a three-dimensional point cloud is superimposed.

The image including adjuster 620 is an image for changing the orientation of a displayed three-dimensional point cloud in response to an input from a user. For example, UI 140 changes the orientation of a three-dimensional point cloud in the image displayed as point cloud image 600 in response to an input received by adjuster 620. In this way, the user can check the three-dimensional point cloud from various angles by operating adjuster 620.

The image including selector 630 is an image for determining whether to automatically generate auxiliary information (for example, allow assigner 120 to generate auxiliary information) in response to an input from the user or allow the user to determine auxiliary information. For example, when the user selects "automatic" (No in step S103 illustrated in FIG. 5), assigner 120 performs the process for generating auxiliary information (step S104 illustrated in FIG. 5). On the other hand, for example, when the user selects "manual" (No in step S103 illustrated in FIG. 5), UI 140 switches the image displayed as the image for receiving an input of auxiliary information.

Figure 8:
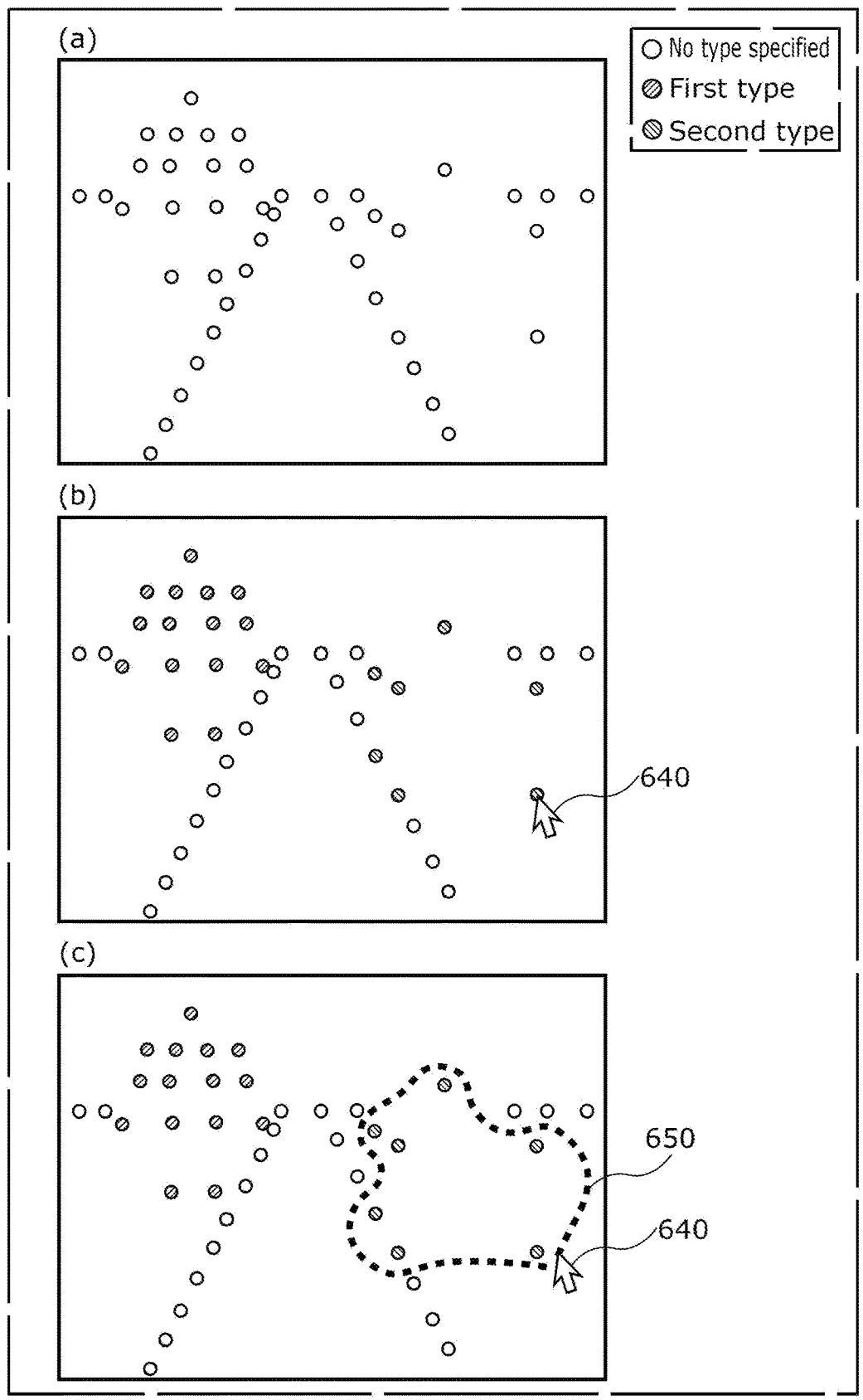
FIG. 8 is a diagram illustrating an example of images when the included in the three-dimensional point cloud densification device according to the embodiment is operated by the user.

FIG. 8 is a diagram illustrating an example of images when UI 140 of three-dimensional point cloud densification device 100 according to the embodiment is operated by the user. Specifically, Part (a) of FIG. 8 is a diagram illustrating an example of an image displayed by UI 140 when "manual" is selected with selector 630 by the user. Part (b) of FIG. 8 is a diagram illustrating an example of an image when the user is inputting auxiliary information by operating UI 140. Part (c) of FIG. 8 is a diagram illustrating another example of the image when the user is inputting auxiliary information by operating UI 140.

When input of "manual" is received from the user via selector 630, UI 140 displays an image representing a three-dimensional point cloud, as illustrated in Part (a) of FIG. 8.

In this case, as illustrated in Part (b) of FIG. 8, the user operates the operation device of UI 140 to move cursor 640 to select a three-dimensional point, and inputs, as auxiliary information, type information indicating a type or the like of an object for the selected three-dimensional point.

For example, in the example illustrated in FIG. 8, a three-dimensional point cloud having no auxiliary information input (assigned) is indicated by a white circle, and a three-dimensional point cloud having auxiliary information input (assigned) is hatched. Thus, while viewing three-dimensional point cloud displayed on UI 140, the user assigns auxiliary information, such as "first type" indicating an object type "tree" or "second type" indicating an object type "house", to each three-dimensional point.

Note that as illustrated in Part (c) of FIG. 8, UI 140 may perform processing that allows the user to select a three-dimensional point cloud altogether by dragging cursor 640 as shown by operation tracing 650.

Figure 9:
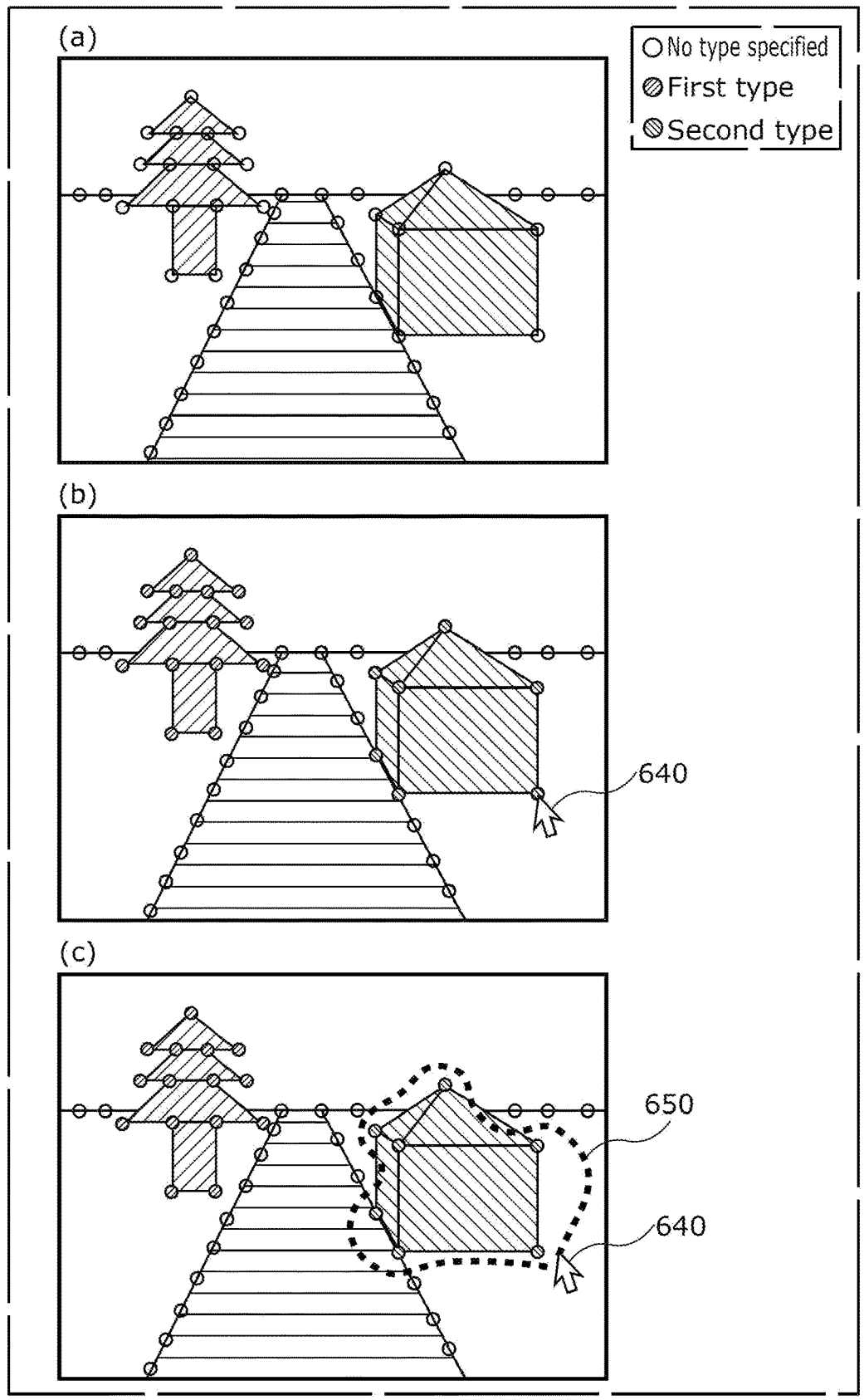
FIG. 9 is a diagram illustrating another example of images when the UI included in the three-dimensional point cloud densification device according to the embodiment is operated by the user.

FIG. 9 is a diagram illustrating another example of the images when UI 140 of three-dimensional point cloud densification device 100 according to the embodiment is operated by the user. Part (a) of FIG. 9 is a diagram corresponding to Part (a) of FIG. 8, Part (b) of FIG. 9 is a diagram corresponding to Part (b) of FIG. 8, and Part (c) of FIG. 9 is a diagram corresponding to Part (c) of FIG. 8.

In the example illustrated in FIG. 9, unlike FIG. 8, UI 140 displays an image (two-dimensional image) on which a three-dimensional point cloud is superimposed.

This allows the user to more easily appropriately select the type of the object formed by the three-dimensional point.

Note that although FIG. 7 illustrates "automatic" and "manual" buttons (parts to be selected by the user) as selector 630, selector 630 can be any selector that allows selection of whether to allow the user to input auxiliary information or allow assigner 120 to generate auxiliary information.

Selector 630 may further include another option, such as "semi-automatic", in addition to "automatic" and "manual". For example, when "semi-automatic" is selected by the user, assigner 120 generates auxiliary information. UI 140 then displays an image including the auxiliary information generated by assigner 120. In order to modify the auxiliary information generated by assigner 120, the user operates UI 140 to input modified auxiliary information.

In this way, the user can start the task of inputting auxiliary information after generally accurate auxiliary information is assigned by assigner 120. Therefore, the amount of work for inputting auxiliary information for each three-dimensional point as intended by the user can be reduced.

(Auxiliary Information Generation)

Figure 10:
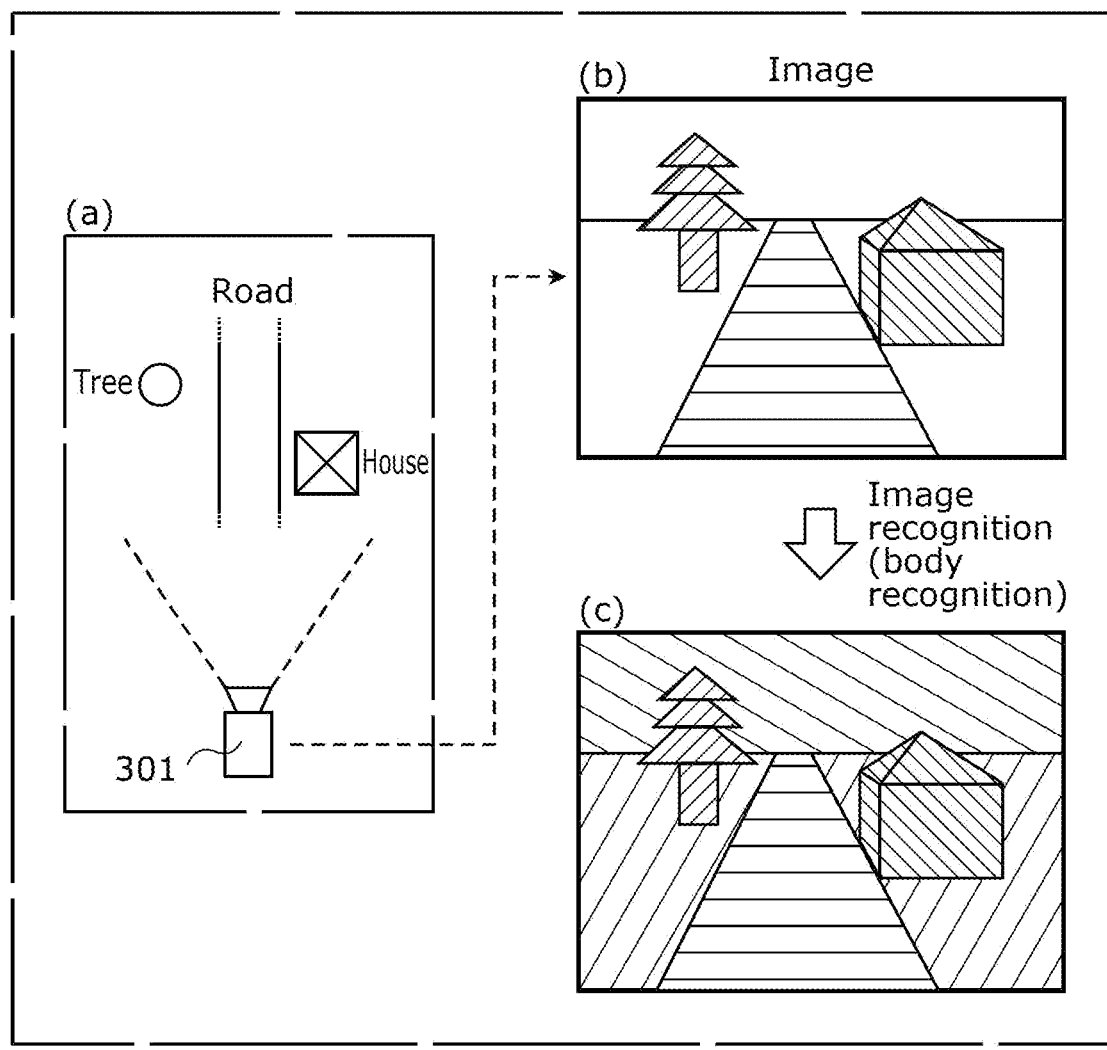
FIG. 10 is a diagram for describing an example of an auxiliary information generation method performed by the three-dimensional point cloud densification device according to the embodiment.

FIG. 10 is a diagram for describing an example of an auxiliary information generation method performed by three-dimensional point cloud densification device 100 according to the embodiment. Specifically, Part (a) of FIG. 10 is a schematic diagram illustrating camera 301 during shooting viewed from above, Part (b) of FIG. 10 is a diagram illustrating an example of an image generated by camera 301 in Part (a) of FIG. 10, and Part (c) of FIG. 10 is a diagram illustrating an example of the image illustrated in Part (b) of FIG. 10 subjected to image recognition (body recognition) by assigner 120.

In the example illustrated in FIG. 10, assigner 120 recognizes (identifies) the types of the objects included in the image through image recognition.

When the position of camera 301 that generates the image used when generating the three-dimensional point cloud to be densified and the position of the real object corresponding to the three-dimensional point cloud are known, the relationship between the three-dimensional points and the pixels included in the image is uniquely determined.

Therefore, the three-dimensional points can be grouped based on which object in the image each three-dimensional point belongs to, and generation of a mesh line spanning different objects can be prevented.

Therefore, densifier 130 can perform densification of a three-dimensional point cloud with high accuracy, that is, in such a manner that a three-dimensional point is added at an appropriate position.

In the example illustrated in FIG. 10, assigner 120 identifies the type of the object formed by each pixel included in the image through image recognition. Furthermore, assigner 120 generates type information indicating the type of the object formed by each three-dimensional point based on the relationship between the three-dimensional point and a pixel included in the image, and assigns the type information to the three-dimensional point as auxiliary information. Densifier 130 identifies a polygon having, as vertices, three-dimensional points assigned the same type information.

Note that the method of recognizing the type of the object is not particularly limited. For example, as with semantic segmentation, assigner 120 may recognize the type of the object formed by each pixel through image recognition. Alternatively, as with instance segmentation, assigner 120 may treat objects of the same type as different types if the objects are different entities. For example, when there are two objects identified as "tree" in an image, assigner 120 may treat one "tree" as a different object than the other "tree".

Figure 11:
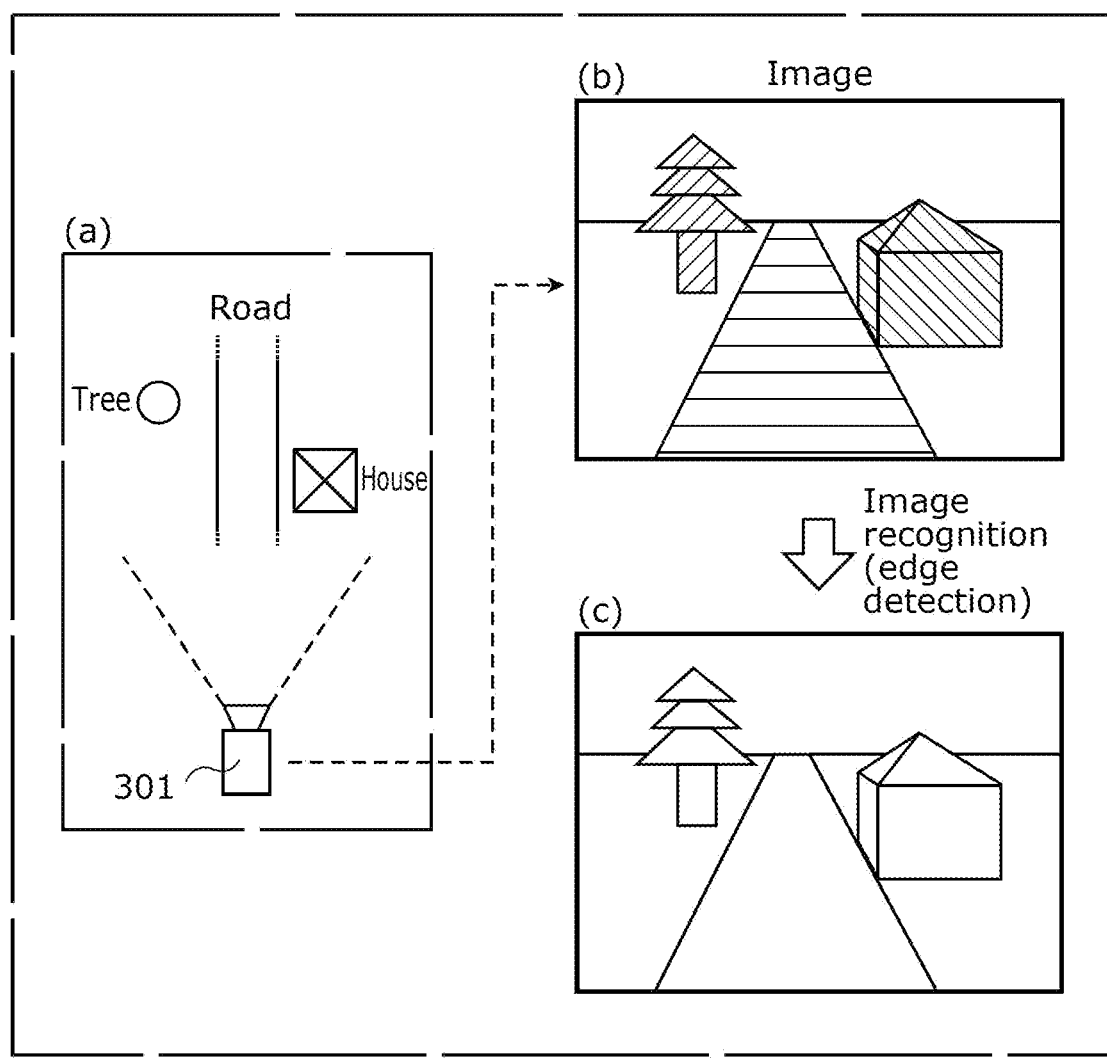
FIG. 11 is a diagram for describing another example of an auxiliary information generation method performed by the three-dimensional point cloud densification device according to the embodiment.

FIG. 11 is a diagram for describing another example of the auxiliary information generation method performed by three-dimensional point cloud densification device 100 according to the embodiment. Specifically, Part (a) of FIG. 11 is a schematic diagram illustrating camera 301 during shooting viewed from above, Part (b) of FIG. 11 is a diagram illustrating an example of an image generated by camera 301 in Part (a) of FIG. 11, and Part (c) of FIG. 11 is a diagram illustrating an example of the image illustrated in Part (b) of FIG. 11 subjected to image recognition by assigner 120.

In the example illustrated in FIG. 11, assigner 120 extracts (generates), as auxiliary information, an edge of an object formed by each pixel included in the image through the image recognition described above. For example, assigner 120 extracts an edge of an object included in the image through the Canny method or the like.

In this process, assigner 120 may assign the same information (connection information) to three-dimensional points that can be connected by mesh lines so that a mesh line does not straddle an edge (that is, does not intersect with an edge at a point). For example, assigner 120 associates ID (Identifier) information specific to each three-dimensional point with connection information, and stores the ID information and the connection information in storage 160.

Densifier 130 identifies a polygon having three-dimensional points having the same connection information as vertices, for example. In this way, densifier 130 can connect three-dimensional points by a mesh line in such a manner that the mesh line does not straddle an edge extracted by assigner 120 (that is, does not intersect with an edge extracted by assigner 120 at a point). That is, densifier 130 can generate a mesh in a three-dimensional point cloud by limiting, based on the edges, the parts to be connected by mesh lines.

Therefore, a mesh line can be prevented from intersecting with a part of an object formed by a three-dimensional point cloud that is likely to constitute a contour thereof. Furthermore, a mesh line can be prevented from being drawn between different objects.

Note that when a stereo camera or an RGB-D camera is adopted as camera 301, densifier 130 may generate a mesh in a three-dimensional point cloud based on depth information obtained from an image and edge information generated by assigner 120.

In that case, when the three-dimensional point cloud obtained from three-dimensional point cloud generation device 200 is sparse (in other words, the number of three-dimensional points included in the three-dimensional point cloud is small), and a mesh cannot be appropriately generated because of the small number of three-dimensional points around the contours of objects, a three-dimensional point can be added at an appropriate position based on the depth information.

Note that densifier 130 may determine the number of three-dimensional points included in the three-dimensional point cloud represented by the point cloud data obtained by obtainer 110, and may determine to perform the densification process when the number is smaller than a predetermined number and not to perform the densification process when the number is equal to or greater than the predetermined number, for example.

Figure 12:
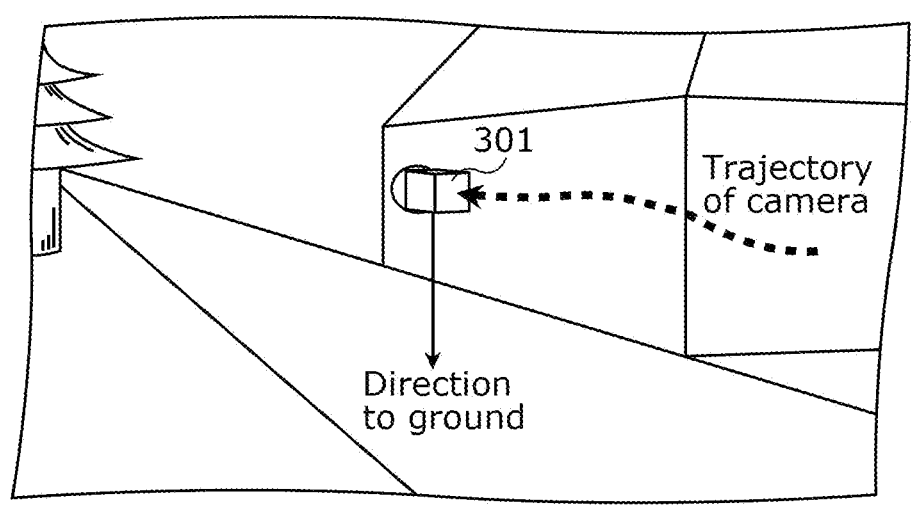
FIG. 12 is a diagram for describing a shooting method with a camera included in the three-dimensional point cloud generation system according to the embodiment.

FIG. 12 is a diagram for describing a shooting method with camera 301 of three-dimensional point cloud generation system 400 according to the embodiment.

Densifier 130 may determine a group to which each three-dimensional point belongs based on camera information indicating at least one of the position or orientation of camera 301.

For example, camera 301 is often kept at the same height from the ground for shooting or the like. In addition, in shooting with camera 301, the ground is typically located at the lower (bottom) side of the image.

Therefore, for example, it is assumed that the user performs shooting by moving camera 301 horizontally or in parallel with the ground. Furthermore, for example, it is assumed that the user performs shooting with camera 301 in such a manner that the ground is located at the lower side.

Under such conditions, when the position of camera 301 that generates the image used when generating the three-dimensional point cloud to be densified and the position of the real object corresponding to the three-dimensional point cloud are known, assigner 120 can identify the position of the ground located below camera 301 (in the direction to the ground illustrated in FIG. 12, for example) based on trajectory information indicating the trajectory of camera 301, and determine the type of the object of a three-dimensional point located at the identified position as "ground".

For example, assigner 120 estimates the position of a plane through which camera 301 passes through, based on a camera trajectory indicated by the camera information. Furthermore, assigner 120 estimates the estimated plane to be a plane that is parallel to the ground. In this case, the position of the ground in the three-dimensional point cloud can be identified based on information indicating the direction from camera 301 to the ground, that is, information indicating the vertical direction, and information indicating the height of camera 301 from the ground, so that auxiliary information "ground" can be assigned to the three-dimensional point located at the position.

In this way, for example, assigner 120 may estimate the vertical direction (gravity direction) in the virtual three-dimensional space in which the three-dimensional point cloud is arranged based on the plane estimated to be a plane that is parallel to the ground, and generate information indicating the estimated vertical direction as auxiliary information.

In this case, based on the vertical direction, assigner 120 can estimate or remove the type of an object of a plurality of three-dimensional points forming a plane.

For example, densifier 130 identifies a polygon having, as vertices, at least three of a plurality of three-dimensional points located below a predetermined position based on the angle between the normal direction of the polygon and the vertical direction. Specifically, for example, densifier 130 determines whether or not the angle between the normal direction of a polygon having, as vertices, at least three of a plurality of three-dimensional points located below a predetermined position and the vertical direction is equal to or greater than a predetermined angle, and does not generate a new three-dimensional point in the polygon having, as vertices, at least three of the plurality of three-dimensional points located below the predetermined position when it is determined that the angle is equal to or greater than the predetermined angle.

Alternatively, for example, densifier 130 removes a three-dimensional point forming a plane whose normal direction is at an angle equal to or greater than a predetermined angle with respect to the vertical direction estimated by assigner 120. Specifically, densifier 130 determines whether or not the angle between the normal direction of a polygon having, as vertices, at least three of a plurality of three-dimensional points located below a predetermined position and the vertical direction is equal to or greater than a predetermined angle, and does not generate a new three-dimensional point in the polygon having, as vertices, at least three of the plurality of three-dimensional points located below the predetermined position but removes at least one of the at least three of the plurality of three-dimensional points located below the predetermined position when it is determined that the angle is equal to or greater than the predetermined angle. All of the at least three three-dimensional points may be removed, or a three-dimensional point that does not constitute a vertex of another polygon of a plurality of polygons or a three-dimensional point determined to be removed based on other conditions may be removed.

This is because a three-dimensional point forming a plane whose normal direction is at an angle equal to or greater than a predetermined angle with respect to the vertical direction estimated by assigner 120 is likely to be noise, which belongs to different objects. Therefore, when densifier 130 performs densification, even if the densification is performed with low accuracy, that is, even if a three-dimensional point is added at an inappropriate position, the three-dimensional point added at the inappropriate position can be appropriately removed.

Note that when densifier 130 removes a three-dimensional point, data of the three-dimensional point may be deleted from storage 160, or may be set not to be displayed on display device 520, for example, without being deleted from storage 160.

The predetermined angle may be arbitrarily determined in advance and is not particularly limited.

For a three-dimensional point forming a plane whose normal direction is perpendicular to the vertical direction, for example, assigner 120 may estimate the type of the object to be wall.

As described above, in shooting with camera 301, the ceiling of a building or the like is typically located on the upper side of the image. Therefore, as in the method of estimating the type of an object to be "ground", when the position of camera 301 that generates the image used when generating the three-dimensional point cloud to be densified and the position of the real object corresponding to the three-dimensional point cloud are known, assigner 120 can identify the position of the ceiling located above camera 301 based on trajectory information indicating the trajectory of camera 301, and determine the type of the object of a three-dimensional point located at the identified position as "ceiling".

(Densification Process)

Figure 13:
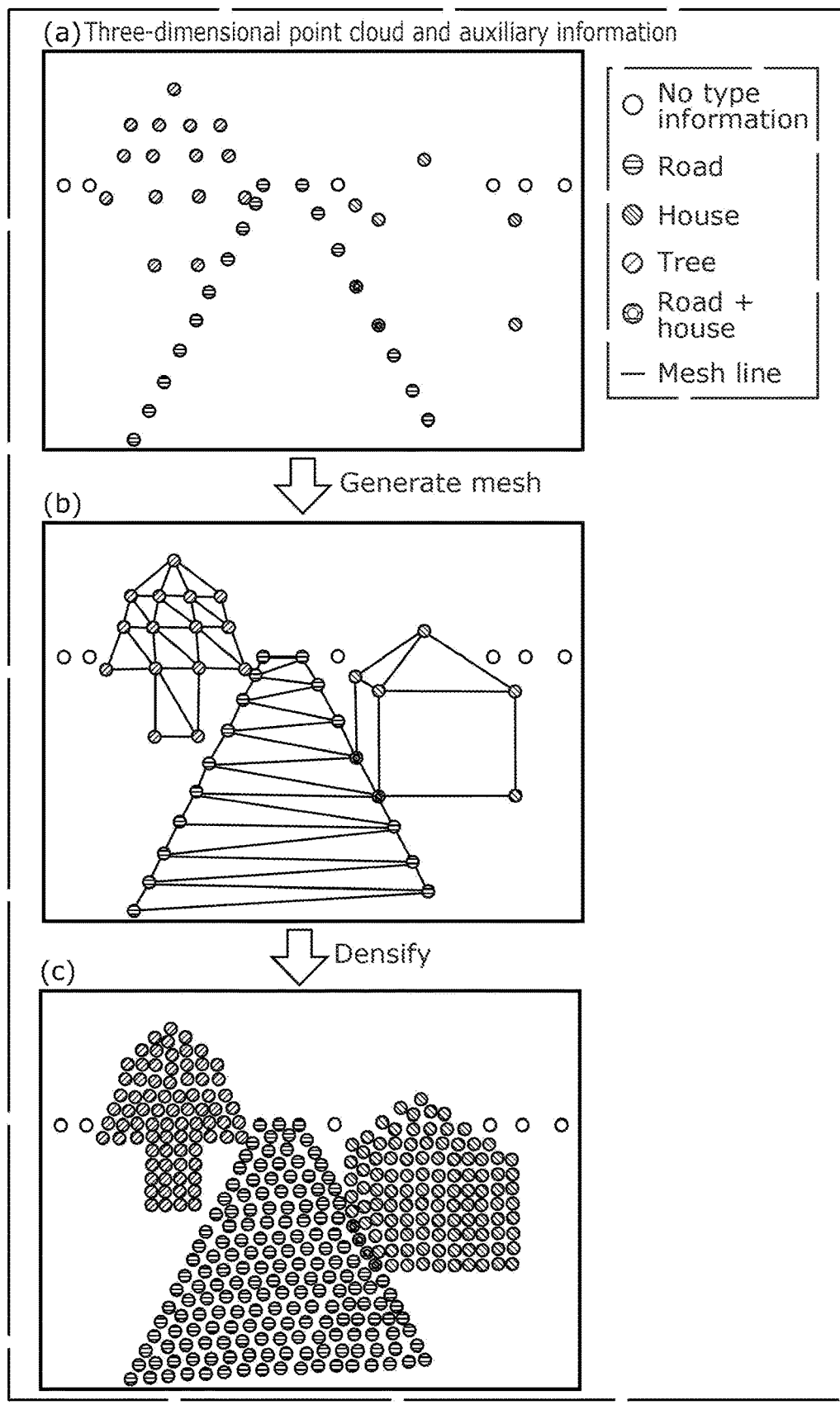
FIG. 13 is a diagram for describing a densification process performed by the three-dimensional point cloud densification device according to the embodiment.

FIG. 13 is a diagram for describing a densification process performed by three-dimensional point cloud densification device 100 according to the embodiment. Specifically, Part (a) of FIG. 13 is a diagram illustrating a three-dimensional point cloud and auxiliary information obtained by obtainer 110. Part (b) of FIG. 13 is a diagram illustrating mesh lines drawn on the three-dimensional point cloud illustrated in Part (a) of FIG. 13 by densifier 130. Part (c) of FIG. 13 is a diagram illustrating a dense three-dimensional point cloud generated by densifier 130 performing the densification process on the three-dimensional point cloud illustrated in Part (a) of FIG. 13, that is, generating new three-dimensional points for the three-dimensional point cloud.

Note that Part (a) of FIG. 13 illustrates an example in which assigner 120 assigns type information indicating the type of an object to each three-dimensional point as auxiliary information.

For example, obtainer 110 obtains a three-dimensional point cloud stored in three-dimensional point cloud storage 163. Assigner 120 then identifies the type of an object formed by each pixel included in an image stored in video storage 161 through image recognition, for example. A three-dimensional point corresponding to each pixel is then assigned type information indicating the type of the object formed by the pixel as auxiliary information. In this way, as illustrated in Part (a) of FIG. 13, each three-dimensional point is assigned type information, such as "tree", "house", or "road".

Note that a three-dimensional point may be assigned a plurality of items of type information, such as "road" and "house".

As illustrated in Part (b) of FIG. 13, densifier 130 then identifies a polygon having, as vertices, three-dimensional points assigned type information indicating the same type. For example, densifier 130 identifies a polygon by generating a mesh by connecting, by mesh lines, three-dimensional points having type information indicating at least one common type.

As illustrated in Part (c) of FIG. 13, densifier 130 then generates a dense three-dimensional point cloud by generating a new three-dimensional point in the polygon.

In this way, by connecting only three-dimensional points of the same type by mesh lines, for example, densifier 130 can prevent generation of a mesh line connecting three-dimensional points forming different objects, such as a road, a tree, or a house.

Densifier 130 generates a mesh by projecting a three-dimensional point onto an image, for example. The method of generating a mesh may be the Delaunay triangulation, for example.

Note that when there is a result of instance segmentation by assigner 120, for example, densifier 130 may generate a mesh under a constraint that three-dimensional points assigned type information indicating the same type can be connected by mesh lines only in the same region as three-dimensional points assigned type information indicating the same type (that is, a region enclosed by such three-dimensional points), for example.

In that case, when three-dimensional points that have type information indicating the same type and form different objects are adjacent to each other, for example, generation of a mesh line connecting the three-dimensional points is prevented.

Furthermore, densifier 130 may generate a dense depth image by projection (back projection) of the dense three-dimensional point cloud, generate a three-dimensional point cloud based on the generated dense depth image, and densify the generated three-dimensional point cloud.

Furthermore, densifier 130 may generate a mesh by connecting neighboring three-dimensional points in a three-dimensional space, rather than by projecting three-dimensional points onto an image to determine parts to be connected by mesh lines.

Furthermore, densifier 130 may calculate normals of mesh lines (more specifically, a polygon) and filters the mesh lines based on the calculated normals. For example, when a polygon having, as vertices, three-dimensional points forming the ground, a road or the like is identified, the normal direction of the polygon is likely to be the same as the vertical direction (gravity direction). That is, when the normal direction of a polygon having, as vertices, at least three three-dimensional points forming the ground, a road or the like is not parallel to the vertical direction, at least one of the at least three three-dimensional points is likely to be assigned erroneous type information. Therefore, densifier 130 may determine whether or not the angle between the normal and the vertical direction is equal to or smaller than a predetermined angle, and determine whether to delete the mesh lines or not based on the determination result.

Note that the predetermined angle may be determined based on the distance from the lens center of camera 301 to the polygon having the normal. For example, the predetermined angle may be set greater as the distance is smaller.

(Conclusion)

Figure 14:
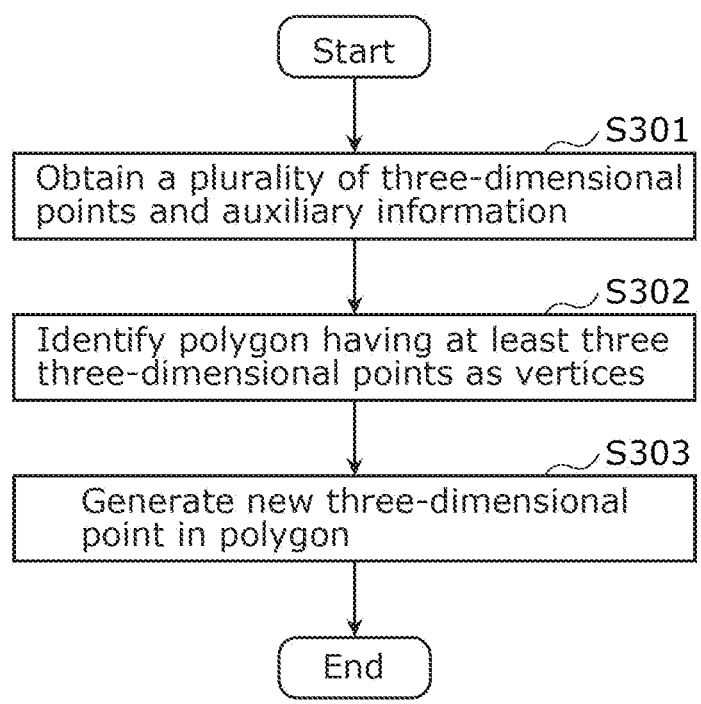
FIG. 14 is a flowchart illustrating a processing procedure of the three-dimensional point cloud densification device according to the embodiment.

FIG. 14 is a flowchart illustrating a processing procedure of three-dimensional point cloud densification device 100 according to the embodiment.

First, obtainer 110 obtains a plurality of three-dimensional points each indicating the three-dimensional position of at least one object and auxiliary information for creating a polygon (S301). Obtainer 110 may obtain point cloud data including the plurality of three-dimensional points from three-dimensional point cloud generation device 200 or three-dimensional point cloud storage 163. Obtainer 110 may obtain auxiliary information from the user via UI 140 or may obtain, from assigner 120, auxiliary information generated by assigner 120.

Densifier 130 then identifies a polygon having, as vertices, at least three of the plurality of three-dimensional points based on the auxiliary information (S302). For example, densifier 130 determines a group to which each three-dimensional point belongs based on the auxiliary information. For example, when the auxiliary information is type information, densifier 130 determines (classifies) three-dimensional points assigned type information including at least one common type as the same group. Densifier 130 then identifies a polygon having, as vertices, three-dimensional points belonging to the same group.

Densifier 130 then generates a new three-dimensional point in the identified polygon (S303).

[Advantageous Effects, Etc.]

A three-dimensional point is generated based on a position (feature point) that is a feature of an object included in a plurality of images, for example.

Here, when the number of feature points is small, the number of the points forming the three-dimensional point cloud forming the object is small. In this case, a new three-dimensional point is added to the three-dimensional point cloud as a three-dimensional point forming the three-dimensional model. A three-dimensional point cloud having high point density is generated in this way to generate a three-dimensional model that resembles to the subject in appearance.

When adding a new three-dimensional point to a three-dimensional point cloud forming a three-dimensional model, the three-dimensional point needs to be added at an appropriate position.

In view of this, three-dimensional point cloud densification device 100 according to the embodiment includes: obtainer 110 that obtains a plurality of three-dimensional points and auxiliary information, the plurality of three-dimensional points each indicating a three-dimensional position of at least one object, the auxiliary information being provided for creating a polygon; and densifier 130 that: identifies the polygon having, as vertices, at least three three-dimensional points among the plurality of three-dimensional points, based on the auxiliary information; and generates a new three-dimensional point inside the polygon.

Accordingly, densifier 130 can identify a polygon having at least three three-dimensional points as vertices based on the auxiliary information. Therefore, densifier 130 can generate a new three-dimensional point at an appropriate position by adding a three-dimensional point in the identified polygon.

Furthermore, for example, obtainer 110 obtains the auxiliary information via an operation device (for example, UI 140) for receiving an instruction from a user. For example, the instruction is an instruction that specifies the shape of the polygon.

Accordingly, since densifier 130 identifies a polygon by obtaining a specification of the shape of the polygon from the user, the densifier can generate a new three-dimensional point at a position desired by the user.

Furthermore, for example, three-dimensional point cloud densification device 100 further includes assigner 120 that generates the auxiliary information based on image data obtained by shooting the at least one object.

Furthermore, for example, assigner 120 generates, as the auxiliary information, type information indicating types of objects included in the image data, and assigns, to each of the plurality of three-dimensional points, the type information corresponding to the three-dimensional point. In this case, for example, densifier 130 identifies the polygon having, as vertices, the at least three three-dimensional points that have a same type of object.

Accordingly, densifier 130 can generate a new three-dimensional point that complements three-dimensional points forming an object of the same type.

Furthermore, for example, assigner 120 generates, as the auxiliary information, an edge of an object included in the image data. In this case, for example, densifier 130 identifies the polygon that does not cross the edge.

Accordingly, densifier 130 can prevent a new three-dimensional point from being generated at a position between different objects where no object exists.

Furthermore, for example, obtainer 110 obtains, as the auxiliary information, camera information indicating a position and an orientation of camera 301 at a time of shooting, camera 301 generating image data items obtained by shooting the at least one object. In this case, for example, densifier 130 identifies the polygon based on the camera information.

Furthermore, for example, densifier 130 identifies the polygon having, as vertices, the at least three three-dimensional points that are located below a predetermined position among the plurality of three-dimensional points, based on a vertical direction in a virtual three-dimensional space representing the plurality of three-dimensional points, the vertical direction being determined based on the camera information.

Accordingly, densifier 130 can determine the types of objects by regarding a plurality of three-dimensional points located at lower positions among the three-dimensional points included in the three-dimensional point cloud as the ground, such as a road, for example, and identify a polygon having three-dimensional points of the same object type as vertices.

Furthermore, for example, densifier 130 determines a height of camera 301 in the vertical direction of a virtual three-dimensional space, based on the camera information, and determines the predetermined position based on the height determined.

Accordingly, densifier 130 can more appropriately identify a three-dimensional point whose object type is ground based on the height of camera 301.

Furthermore, for example, densifier 130 identifies the polygon based on an angle formed by the vertical direction and a normal direction of the polygon having, as vertices, the at least three three-dimensional points that are located below the predetermined position among the plurality of three-dimensional points.

For example, the normal direction of a polygon having, as vertices, three-dimensional points forming the ground, a road or the like is likely to be the same as the vertical direction. That is, when the vertical direction and the normal direction of a polygon having, as vertices, at least three three-dimensional points forming the ground, a road or the like are not parallel, and the angle therebetween is too great, at least one of the at least three three-dimensional points is likely to be noise, rather than a three-dimensional point forming the ground, a road or the like. Therefore, with such a configuration, the densifier can prevent a new three-dimensional point from being generated in a polygon having, as a vertex, a three-dimensional point that is not likely to be a three-dimensional point forming the ground, a road or the like, for example.

Furthermore, for example, the auxiliary information is information indicating groups to which the plurality of three-dimensional points belong. In this case, for example, densifier 130 identifies the polygon having, as vertices, the at least three three-dimensional points among three-dimensional points that belong to a same group based on the auxiliary information.

Accordingly, densifier 130 can identify a polygon having, as vertices, three-dimensional points that form or are likely to form the same object, since the densifier identifies a polygon based on the auxiliary information that indicates, as three-dimensional points belonging to the same group, three-dimensional points that form or are likely to form the same object, such as three-dimensional points of the same object type, three-dimensional points that can be connected by lines that do not straddle an edge of an object included in the image data, or three-dimensional points located below a predetermined position in the virtual three-dimensional space representing three-dimensional points.

Furthermore, a three-dimensional point cloud densification method according to an aspect of the present disclosure includes: obtaining a plurality of three-dimensional points and auxiliary information, the plurality of three-dimensional points each indicating a three-dimensional position of at least one object, the auxiliary information being provided for creating a polygon (S301); identifying the polygon having, as vertices, at least three three-dimensional points among the plurality of three-dimensional points, based on the auxiliary information (S302); and generating a new three-dimensional point inside the polygon (S303).

Accordingly, the same advantageous effects as the three-dimensional point cloud densification device can be produced.

It should be noted that the present disclosure may be implemented as a program for causing a computer to execute the steps included in the three-dimensional point cloud densification method described above. Furthermore, the present disclosure may be implemented as a non-transitory computer readable recording medium, such as a CD-ROM and the like, on which the program is recorded. Furthermore, the present disclosure may be implemented as information, data, or a signal of the program. In addition, the program, the information, the data, and the signal may be distributed via a communication network such as the Internet, and the like.

[Other Embodiments]

Although the three-dimensional point cloud densification device, and so on, according to the present disclosure have been described above based on the foregoing embodiment, the present disclosure is not limited to the foregoing embodiment.

For example, three-dimensional point cloud generation device 200 may generate a three-dimensional point cloud again by using the dense three-dimensional point cloud generated by three-dimensional point cloud densification device 100.

For example, when three-dimensional point cloud densification device 100 does not receive an instruction from the user but automatically performs the densification process and outputs the result when a three-dimensional point cloud is input, three-dimensional point cloud densification device 100 need not include UI 140.

Furthermore, for example, in the foregoing embodiments, each of the structural components of processing units such as controller 153 and the like included in three-dimensional point cloud densification device 100 may be configured of one or more electronic circuits. Each of the one or more electronic circuits may be a general-purpose circuit or a dedicated circuit. The one or more electronic circuits may include, for example, a semiconductor device, an integrated circuit (IC), or a large-scale integration (LSI), etc. The IC or LSI may be integrated in a single chip or several chips. Although referred to here as IC or LSI, the name may change depending on the scale of integration, and may be referred to as a system LSI, very large scale integration (VLSI), or ultra large scale integration (ULSI). Furthermore, a field programmable gate array (FPGA) that can be programmed after manufacturing of the LSI may be used for the same purpose.

Furthermore, general or specific aspects of the present disclosure may be implemented as a system, an apparatus, a method, an integrated circuit, or a computer program. Alternatively, the general or specific aspects of the present disclosure may be implemented as a non-transitory computer-readable recording medium, such as an optical disc, a hard disk drive (HDD), or a semiconductor memory, on which the computer program is recorded. Furthermore, the general or specific aspects of the present disclosure may be implemented as any combination of a system, an apparatus, a method, an integrated circuit, a computer program, and a recording medium.

The present disclosure also includes forms obtained by making various modifications to the above embodiments that can be conceived by those skilled in the art, as well as forms realized by combining structural components and functions in the embodiments, without departing from the essence of the present disclosure.

The invention claimed is:

1. A three-dimensional point cloud densification device comprising:
a processor; and
memory, wherein
using the memory, the processor:
obtains a plurality of three-dimensional points and auxiliary information, the plurality of three-dimensional points each indicating a three-dimensional position of at least one object, the auxiliary information being provided for creating a polygon;
identifies the polygon having, as vertices, at least three three-dimensional points among the plurality of three-dimensional points, based on the auxiliary information; and
generates a new three-dimensional point inside the polygon,
the auxiliary information is provided for selecting at least one of:
at least one three-dimensional point among the plurality of three dimensional points; or
a mesh line connecting any two three-dimensional points among the plurality of three-dimensional points,
in obtaining the plurality of three-dimensional points and the auxiliary information, the processor obtains, as the auxiliary information, camera information indicating a position and an orientation of a camera at a time of shooting, the camera generating image data items obtained by shooting the at least one object,
in identifying the polygon, the processor identifies the polygon based on the camera information, and
in identifying the polygon, the processor identifies the polygon having, as vertices, the at least three three-dimensional points that are located below a predetermined position among the plurality of three-dimensional points, based on a vertical direction in a virtual three-dimensional space representing the plurality of three-dimensional points, the vertical direction being determined based on the camera information.

2. The three-dimensional point cloud densification device according to claim 1, wherein
in obtaining the plurality of three-dimensional points and the auxiliary information, the processor obtains the auxiliary information via an operation device for receiving an instruction from a user, and
the instruction specifies a shape of the polygon.

3. The three-dimensional point cloud densification device according to claim 1, wherein
the processor further generates the auxiliary information based on image data obtained by shooting the at least one object.

4. The three-dimensional point cloud densification device according to claim 3, wherein
in generating the auxiliary information, the processor generates, as the auxiliary information, type information indicating types of objects included in the image data, and assigns, to each of the plurality of three-dimensional points, the type information corresponding to the three-dimensional point, and
in identifying the polygon, the processor identifies the polygon having, as vertices, the at least three three-dimensional points that have a same type of object.

5. The three-dimensional point cloud densification device according to claim 3, wherein
in generating the auxiliary information, the processor generates, as the auxiliary information, an edge of an object included in the image data, and
in identifying the polygon, the processor identifies the polygon that does not cross the edge.

6. The three-dimensional point cloud densification device according to claim 1, wherein
the processor determines a height of the camera in the vertical direction based on the camera information, and determines the predetermined position to be below the height determined.

7. The three-dimensional point cloud densification device according to claim 1, wherein
in identifying the polygon, the processor identifies the polygon based on an angle formed by the vertical direction and a normal direction of the polygon having, as vertices, the at least three three-dimensional points that are located below the predetermined position among the plurality of three-dimensional points.

8. The three-dimensional point cloud densification device according to claim 1, wherein
the auxiliary information is information indicating groups to which the plurality of three-dimensional points belong, and
in identifying the polygon, the processor identifies the polygon having, as vertices, the at least three three-dimensional points among three-dimensional points that belong to a same group based on the auxiliary information.

9. A non-transitory computer readable recording medium having recorded thereon a program for causing a computer to execute a three-dimensional point cloud densification method, the three-dimensional point cloud densification method including:
obtaining a plurality of three-dimensional points and auxiliary information, the plurality of three-dimensional points each indicating a three-dimensional position of at least one object, the auxiliary information being provided for creating a polygon;
identifying the polygon having, as vertices, at least three three-dimensional points among the plurality of three-dimensional points, based on the auxiliary information; and
generating a new three-dimensional point inside the polygon, wherein
the auxiliary information is provided for selecting at least one of
at least one three-dimensional point among the plurality of three dimensional points; or
a mesh line connecting any two three-dimensional points among the plurality of three-dimensional points,
the obtaining of the plurality of three-dimensional points and the auxiliary information comprises obtaining, as the auxiliary information, camera information indicating a position and an orientation of a camera at a time of shooting, the camera generating image data items obtained by shooting the at least one object, and the identifying of the polygon comprises (i) identifying the polygon based on the camera information, and (ii) identifying the polygon having, as vertices, the at least three three-dimensional points that are located below a predetermined position among the plurality of three-dimensional points, based on a vertical direction in a virtual three-dimensional space representing the plurality of three-dimensional points, the vertical direction being determined based on the camera information.

* * * * *